United States Patent [19]
Catlin

[11] Patent Number: 5,819,408
[45] Date of Patent: Oct. 13, 1998

[54] RECYCLABLE, LOW COST, COLLISION-RESISTANT AUTOMOBILE CHASSIS AND BODY

[75] Inventor: Christopher Scott Catlin, Malibu, Calif.

[73] Assignee: XCORP, Inc., Malibu, Calif.

[21] Appl. No.: 680,587

[22] Filed: Jul. 10, 1996

[51] Int. Cl.[6] .................................................. B60R 27/00
[52] U.S. Cl. .......................... 29/897.2; 29/460; 296/189; 296/205
[58] Field of Search .................................. 72/347, 379.2, 72/359; 29/897.2, 460; 296/191, 188, 189, 900, 901, 197, 195, 194, 193, 209, 205, 204, 203

[56] References Cited

U.S. PATENT DOCUMENTS

| | | | |
|---|---|---|---|
| 3,568,487 | 3/1971 | Riesener | 72/347 X |
| 3,853,349 | 12/1974 | Moore | 296/189 |
| 3,888,502 | 6/1975 | Felzer et al. | 296/901 X |
| 4,603,571 | 8/1986 | Wessels | 72/347 X |
| 4,898,419 | 2/1990 | Kenmochi et al. | 296/191 X |
| 5,660,428 | 8/1997 | Catlin | 296/205 |

*Primary Examiner*—Linda Johnson
*Attorney, Agent, or Firm*—Ladas & Parry

[57] ABSTRACT

A recyclable, low cost, collision-resistant automobile chassis and body and method for fabricating the same. The method of manufacture comprises; fabricating a plurality of generally planar bulkheads from a metal alloy; disposing the bulkheads in a generally and mutually parallel orientation, each bulkhead perpendicular to and aligned generally transversely and symmetrically relative to a common central horizontal longitudinal axis; fabricating a plurality of chassis segments from the metal alloy, each segment comprising a multiplicity of spaced hollow cells fixed at one end in a common surface; interposing and rigidly attaching at least one of said pluralities of chassis segments between respective bulkheads to form a plurality of chassis sections, a section defined as the portion of the fabricated chassis between two adjacent bulkheads; and permeating the plurality of chassis sections with liquefied polymer between and around said hollow cells.

19 Claims, 16 Drawing Sheets

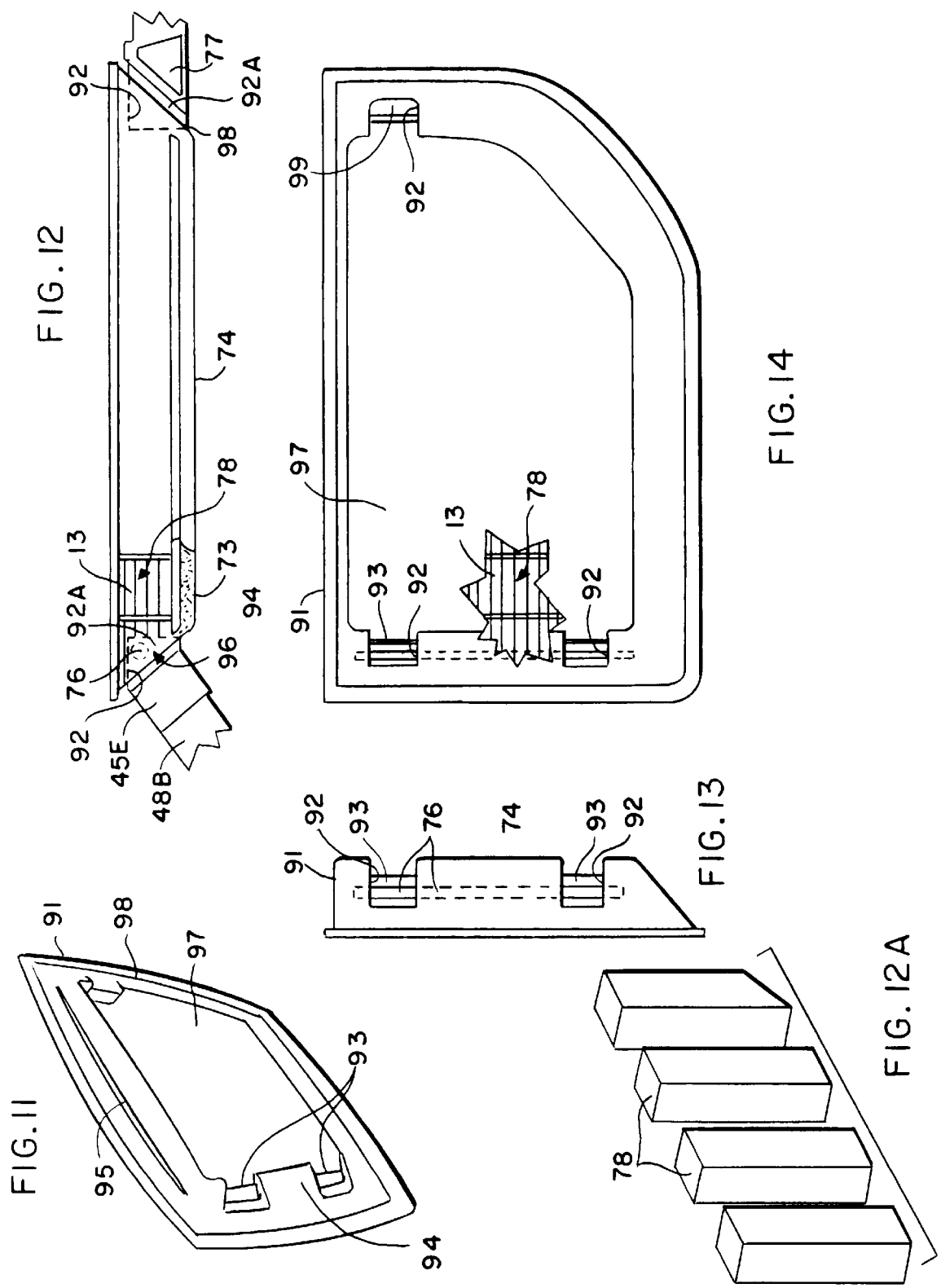

RECYCLABLE, LOW COST, COLLISION-RESISTANT AUTOMOBILE CHASSIS AND BODY

BACKGROUND OF THE INVENTION

CROSS REFERENCE TO RELATED APPLICATIONS

The inventor of this invention is also the inventor of "RECYCLABLE, LOW-COST, COLLISION-RESISTANT AUTOMOBILE CHASSIS AND BODY", U.S. application Ser. No. 08/371,228, filed Jan 11, 1996 now U.S. Pat. No. 5,660,428.

1. Field of the Invention

The present invention relates to the field of automotive design, manufacture and assembly, and more particularly to an automobile chassis and body which are highly resistant to head-on, broadside and rear-end collisions, have low fixed and recurring production costs, are manufactured using processes minimizing waste products and eliminating toxic vapor emissions, and are almost totally comprised of recyclable materials. Specifically, a chassis comprised substantially of aluminum alloy and thermoplastic and a body and interior panels consisting entirely of thermoplastic provide stronger, lighter, and less expensive alternatives to reinforced steel frames and sheet metal body panels currently utilized universally by automobile manufacturers. In order to build cars comprised of thousands of parts, current automotive construction systems require massive investment in plant and equipment, are energy and labor intensive, are major contributors to pollution, and produce end product vehicles that often vary substantially in quality. In marked contrast, constructing an automobile in accordance with the principles of the invention enables substantial reduction of the types of materials and numbers of parts needed and makes parts much easier to assemble and disassemble, thus minimizing the labor and energy required, while enabling superior quality control during production, and ensuring that materials eventually recycled can be efficiently restored to high manufacturing quality.

2. Description of the Prior Art

For about the past ten years, the U.S. has not been the world car production volume leader. The U.S. automobile industry has also not been a technology leader for most of the past forty to fifty years.

Over the past 10 to 20 years, G. M. and other international automobile companies have put major efforts into such concept automobiles "for the future" (always for the distant future) as the AERO 2000, but have never been able to bring them to commercialization. This lack of success resembles XEROX and the ALTOS PC/WORKSTATION, or the other new technology, product, commercialization problems cited with the previous large leading companies who did not read the changing technoeconomic waters well. Much expensive research can be done, with expensive concepts and even more expensive engineering prototypes, but the successful commercialization of the "ultimate product" is always many more big dollars and years into the future.

The bottom line problem with the automobile is just too many parts and assemblies, and their continued increase. A major redesign, simplification, and systems integration of automobile technology and business is required to bring the total cost (life cycle ownership costs) down. Total revenue minus total cost, i.e. total margin, per employee is what measures real productivity. This means that, not only do manufacturing process and assembly labor hours and materials costs have to be reduced for the automobile assemblers and their supplies, but the administrative and support (indirect) hours (or head count) must come down. Replacing hourly workers with more expensive accountants, finance people, and CIM Computer software programmers does not necessarily solve this problem. The total direct and indirect labor hours per automobile, and the materials cost, all combined must be reduced. Such massive total technology system changes is what brought the significant cost savings and major added value for reduced cost to all other recent electronic technology products.

Henry Ford and the Model "T", involved the movement of a bulky, heavy, and awkward object incorporating some 15,000 parts through a multiplicity of short-cycle subassembly processing steps in a standardized conversion path. The modern car, however, has basically become too complex to be made very agile without dramatic redesign and simplification of the product, the car. Thus, this major industry is already buried in technoeconomics problems. Much of its introduction of new technology has 1) occurred after it has been introduced by other countries automobile industry leaders, 2) problematic start-ups, and 3) required significant warrantee, maintenance, service claims, customer/dealer expenses, and multi-year/multi-billion dollar rebates, discounts with reduced financing, or now major lease/buy incentives to move, while the initial purchase prices continue to escalate.

The general economic situation for the typical (middle class) American family deteriorated greatly in the last 30 years in terms of buying power. Terms like stagnation decline are often used. As a result, it has been reported that some seventy (70) percent U.S. householders cannot afford a new car.

The maintenance and cost of maintenance of an automobile continues to be a problem with the increased complexity. Cost of maintenance and repairs continue to escalate, leading to increased claims of (and opportunities for) service mechanics work. Cars appear to becoming so smart (complex) with the mixed electronic, mechanical, vacuum, hydraulic, and other technology systems that mechanics and their mechanical training cannot keep up. This is the problem one has with designing, building, and maintaining complex "hybridized" or mixed (not integrated) technologies.

As a result of the basic problem of too many mechanical piece parts, and additional other electronic, etc. assemblies and their effect on cost, and with the current system's design for manufacture approach, automobile costs and prices keep going up with inflation. As the industry can no longer use only styling changes, (rebending metal, adding chrome, a fancy paint design) to carry the needed price increase, electronics is being added to increase features and options, and to improve the basic engine performance by the addition of controls and powertrain performance integration. By this approach, the major objective is to add fancier features and raise the price significantly, to increase gross profit margins.

In summary, the internal combustion engine (ICE) and steel mechanical body/frame and mechanical system base technology system for the automobile have reached old age. Recognizing, understanding, and accepting the fact this is competitively true is required by the automobile industry and its various associated interest stockholders before a serious full court press (new technology system base for a design) change process will be implemented and accelerated by this industry.

The economic and social aspects of the automobile could be soon overshadowed by its environmental impact. Life on this planet is threatened by biological, chemical, and nuclear proliferation, new and more lethal killer viruses, and cyclical famines, and now a new threat has arrived, an equally dangerous threat—the car. Today, everyone seems to want a car. And within another 25 years, there may be 1 billion cars on the world's roads.

Despite these constraints and despite compelling evidence that Western-style automotive development on a global scale could have disastrous effects on human and planetary well-being, the demand for cars is soaring across the developing world. This demand has not only stimulated developing economics, but has attracted a growing influx of foreign car manufacturers hoping to establish lucrative new markets.

Finally, there is the problem of motor vehicle accidents. Around the world, car crashes now claim nearly a half-million lives a year—most common cause of death short of war. Motor vehicle crashes are an epidemic that costs Americans 137 billion a year, more than the Persian Gulf War or the Northridge, Calif. earthquake.

In this new understanding of development, satisfactions of mobility and freedom do not have to be provided by the current technology cars—whether in California or in India. Fresh approaches will be required, not just to the technology of auto transport, but more importantly, to the design of communities. Cars that are much lower cost will reduce the economic impact, cars that are not only much cleaner in use but also are produced in clean manufacturing facilities and are fully recyclable will dramatically cut the ecological impact on the country. And cars that can be built inside each major country can give that country control of its major industrial base. Even though many who study these problems conclude that the car must be replaced by the redesign of the community to reduce the need for its use, expansion of public transportation, and higher gasoline taxes, they are not listening to the precise studies in which they have been involved. For many reason, both micro economic and macro economic, and cultural and personal, the car's use will be fast spreading across the globe for many years to come. Therefore, it is time to develop the next generation of cars to solve these immense problems.

Even with considerable investment in robotics technology, automobile production is still a complex, high labor situation. Cars are made by creating and interconnecting over ten thousand parts to form integrated transportation systems using several types of metals including steel, iron, aluminum, copper, zinc, and many types of plastics, glass, rubber, and other materials. The fabrication process is based on a series of steps, which require large factories with long assembly lines and complex support systems. The physics underlying these manufacturing steps suggests several potential obstacles to continued technical progress. These limitations are based on the number of parts, fabrication requirements of various materials, and the many bonding systems required. These limitations have brought major innovation in terms of a marked increase in value, performance, and safety to a slow crawl over the past two decades, while the cost of transportation has considerably outstripped the average wage increase. Nevertheless, as the stream becomes a trickle, the economic consequences of approaching technical barriers themselves are reached. For example, the cost of achieving higher levels of performance rise very rapidly as the limits of a manufacturing technology are approached and then surpassed. Increasing costs may drive prices beyond what buyers are willing to pay, causing the market to stagnate before the actual barriers are encountered.

The principles outlined so far apply to all kinds of transportation parts, but the chassis/body is the highest investment parts group. Twenty-five years ago, the price of a car was dramatically cheaper than it is today. But over the same period the cost of building a factory to manufacture such chassis and bodies has risen dramatically with the need for robotics and increased quality tooling and increase in types of materials and their required fabrication. This has put the business beyond the reach of all but a very few large firms. Such skyrocketing costs, propelled mainly by the expense of having to achieve ever more imposing technical breakthroughs, have once again focused attention on the limits of the transportation industry.

The car industry is not about to come to a screeching halt anytime soon. But the barriers now being approached are so high that getting beyond them will probably cause more far-reaching changes than did previous cycles of this kind. One of several possible solutions is to reduce the value of the labor component which, in turn, initiates a search for new materials requiring less labor intensive construction. Another solution is to find new materials and structures that will, in turn, require less investment in large scale production systems. Another solution is to reduce the number of parts by combining parts into large sections or modules when produced. And finally, another solution is to reduce the need for such large amounts of energy which in the steel business is not only needed to mine and refine and cast metals, but is also needed during fabrication for stamping, tooling, and welding.

SUMMARY OF THE INVENTION

The inventor has developed a new operating system for the design, production, and use of vehicles which delivers low cost, clean and safe transportation, not only to Western countries but to Third World as well.

The inventor has introduced the Series 200 which offers twice the car for half the price. The Series 200 offers greatly enhanced safety features and is much easier to drive. Employing an integrated transportation technology system (ITTS) will make advanced transportation technologies more generally available throughout society. ITTS combines the power of the most advanced space age materials and structures, advanced rapid prototyping, remote tooling, and flexible manufacturing with the power of the computer to produce a new era in transportation.

The present invention offers a significant breakthrough in vehicle design, materials, and production technology. These cars will be designed and manufactured using standardized product data exchange specifications (PDES). Over computer networks, these digital blueprints will pass between designers and engineers, making it easier to simulate the performance of sundry auto parts before they are made. Whole cars can be computer built and road and crash tested before prototyping. These standardized formats will also allow for more agile manufacturing practices, making it economically feasible to produce more custom tailored models. This technology will allow the development of new materials to create the next generation of lightweight fuel-efficient cars.

The inventor has developed the X222 Roadster which utilizes "edge of" state-of-the-art technologies derived from the billions of dollars spent on America's space and defense programs. The inventor has brought these technologies down to the ground in the form of a one piece all-composite chassis that is lightweight, ultra-strong and low cost. The X222 streamlined two-seater is powered by the feather-weight ultra-low emissions two-stroke Orbital engine and uses a newly developed hi-efficiency continuously variable transmission. It uses a parallel computer driven head-up display and all-digital cockpit controls, an advanced sensor harness, composite exhaust system and active aerodynamics. This vehicle was developed using a dedicated computer net that not only linked the various development teams together but was used to transmit structural and aerodynamic data back and forth from outside supercomputer facilities. In accordance with the invention, this vehicle's composite chassis and plastic body utilizes a manufacturing system that slashes initial plant and equipment costs and allows much more computer controlled production, less energy use and waste production. This technology cuts new car prices by as much as 40% making new cars cost-competitive with used cars opening a 10 million car per year market.

Used cars are the major polluters on our highways. America can become a major exporter of this hi-tech low cost vehicle technology. By employing concepts according to the present invention, the X222 is estimated to attain close to 80 mpg with a retail price of $12,400.

The inventor's car was designed from the beginning to be a production driven design. It utilizes a unique composite material comprised of aluminum and advanced polymer which can be fabricated and molded into large structural bodies in accordance with one aspect of the invention. This not only slashes overall parts count and labor but allows a new level of computer driven manufacturing which slashes salaried payroll and insures less production errors. The largest composite structural body employed is an entire vehicle chassis. Alternatively, the chassis can be constructed of several composite sections glued or otherwise bonded together. In a second alternative, the chassis can be constructed of sections each of which is constructed of one or more composite segments. In a third alternative, the entire chassis can be constructed of such composite segments without forming chassis sections. In any of the alternatives using composite chassis segments, the segments or sections themselves can be constructed of separate composite segment or section parts which can be glued or otherwise bonded together to form a composite chassis segment or section, respectively.

In another aspect of the invention, these new cars are designed to offer several body and interior options that can inexpensively be molded onto the composite chassis.

In a further aspect of the invention, the body and interior can have many snap-on options.

In yet a further aspect of the invention, these new cars also have replaced analog cockpit systems with all-digital systems.

Trends favor the inventor's technology. A world product must blend with local customs of each country offering different bodies, right side drive, trim, detail, and local names. These countries also want control of their own production. The inventor's vehicle and its Modular Production Cell (MPC) system, to be described in detail later, can easily and cheaply do this.

The inventor's car is virtually 100% recyclable. In recycling cars, steel and aluminum consume much greater amounts of energy to produce and recycle than plastics. The increasing complexity of new cars ensures that total disassembly and reprocessing makes them more expensive to recycle. The inventor's technology encodes all body and parts. U.S. automakers are getting together with the plastics industry to develop technology to recover and recycle plastics from scrapped vehicles. The project aims to reduce the more than one million tons of plastic that ends up in landfills each year. The inventor's vehicle will use bar code pieces of plastic to identify the specific plastic material to assist in future recycling.

As the industrial superpowers of Japan, Germany, and America gear up to be the first to build the next generation automobile, the battle lines have been quickly drawn around which material will be used in this "SuperCar." The world's major automotive companies, their governments, and the major steel, aluminum and plastic companies plan to spend billions to create this new "Super Material." A major aluminum manufacturer has already developed an all-aluminum car in a consortium with a major foreign automobile manufacturer. A major plastics manufacturer is developing an all-plastic car, and a large domestic automobile manufacturer is developing a fiberglass chassis. Composite materials using woven Kevlar, S-Glass and carbon fibers have become quite common for aerospace, marine and racing car applications. But these exotic materials suffer from high cost, are labor intensive, are used for low volume applications, suffer from a polluting manufacturing technology, and are not recyclable.

Today, composites are used in commercial aircraft. Besides aerospace applications, composites are used for many marine applications and in automobile racing such as Indy Car and Formula One vehicles. The limiting factors for the utilization of composite technology has always been their high material, labor, and fabrication costs. Fabrication of composites usually includes costly and time consuming autoclaving or vacuum bagging. Current composites have high environmental costs not only because of their toxic composition but also due to their toxic production emissions so well documented in the B-2 program. Just as importantly, composites are not recyclable.

BRIEF DESCRIPTION OF THE DRAWING

FIG. 11 shows a composite aluminum/polymer door panel structure having a hinge arrangement for hingedly mounting the door to the vehicle chassis;

FIG. 12 is a top view of the door panel shown in FIG. 11;

FIG. 12A shows the internal aluminum/polymer parts 78 which are insertable into and bonded together and to the extruded aluminum door frame 91;

FIG. 13 is a side view of the door panel of FIG. 11;

FIG. 14 is a front view of the door panel of FIG. 11;

DETAILED DESCRIPTION OF THE PREFERRED EMBODIMENTS

Figure 1:
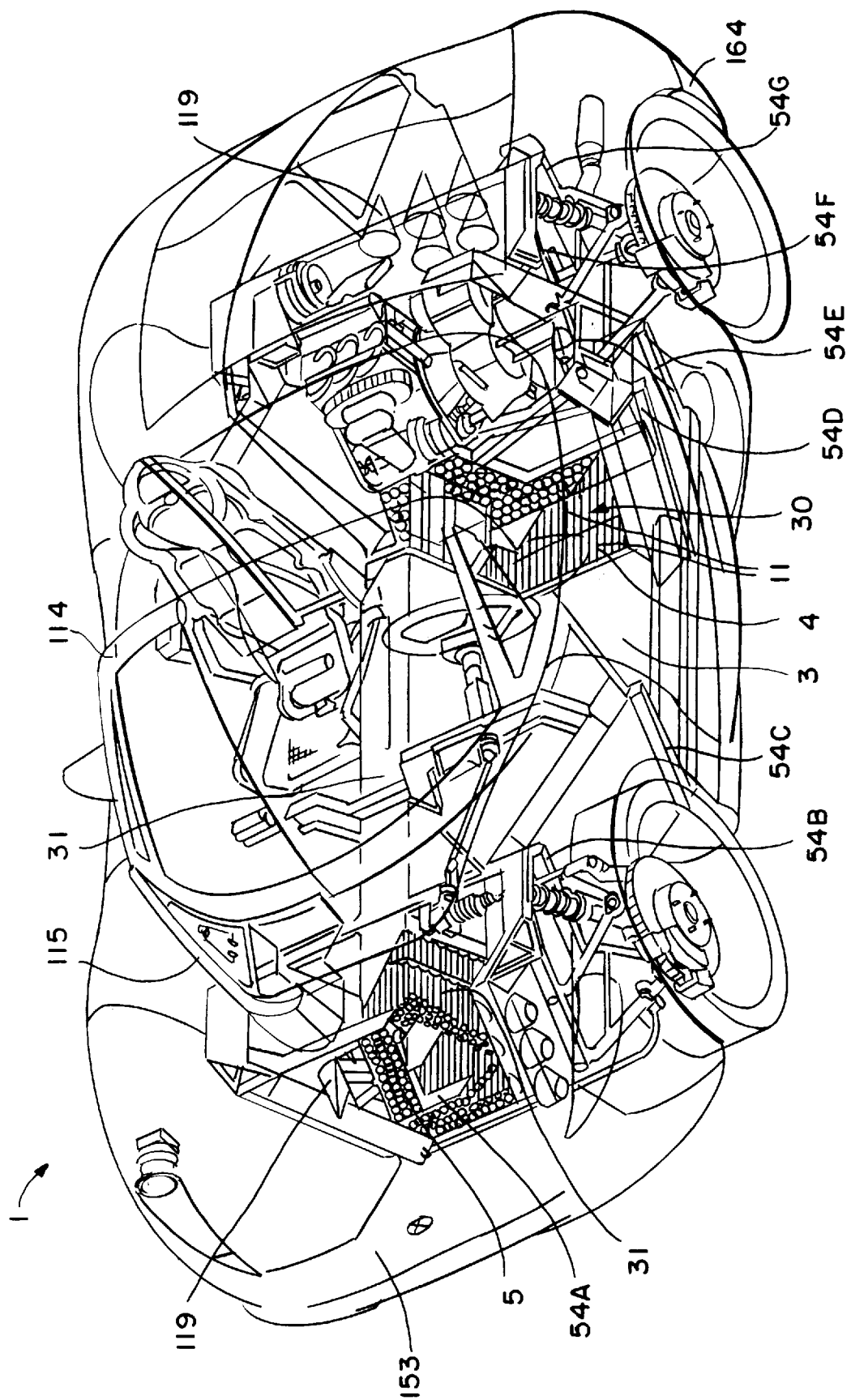
FIG. 1 is an overall view of the automobile made in accordance with the present invention showing some regions in partial cross sections and other regions in a "see-through" format for ease of observing the placement relationship between the various components of the vehicle.

FIG. 1 is a partial cross sectional view and partial "see-through" pictorial of the various components making up the automobile in accordance with the present invention. Many of the parts of the automobile shown in FIG. 1 are not described herein, nor are the subject of the claims. However, they are shown for purposes of indicating the environment for the components of the vehicle disclosed, shown, and described herein.

In FIG. 1, the composite chassis 3 is shown at several places with the outer layer of polymer removed to show the aluminum honeycomb structure beneath. One example of this exposure to the aluminum honeycomb structure beneath the polymer is the hollow center backbone 31, and another example is the floor 30 where indicated. Without the polymer component, the aluminum honeycomb structure has the reference numeral 4. The aluminum honeycomb structure may also be optionally employed in the construction of the major bulkheads such as shown at 54A (front major bulkhead) and 54E (the major bulkhead at the rear of the passenger compartment). As will be understood by reference to subsequent description of the chassis construction, the composite chassis is formed of a number of interconnected honeycomb-cell structures 11, and either small parts, larger segments, even larger sections of the chassis, or the entire chassis may be permeated with molten thermoplastic. For example, transverse segments 41 of the chassis 3 may be constructed of the honeycomb structure 11, and that individual structure permeated with thermoplastic material, and then each aluminum honeycomb/thermoplastic segment 41 is joined to an adjacent segment 41 or bulkhead 54A–54G to form the completed chassis.

The inventor has developed a new class of composites dubbed "Environmental Composites" or EC's. Employing this aluminum/polymer composite creates a vehicle 1 (FIG. 1) with low weight and high crashworthiness and allows the use of a smaller, lower emissions powerplant. This composite can be formed into many configurations with less energy and less investment in plant and equipment than comparable steel panel construction.

Figure 2:
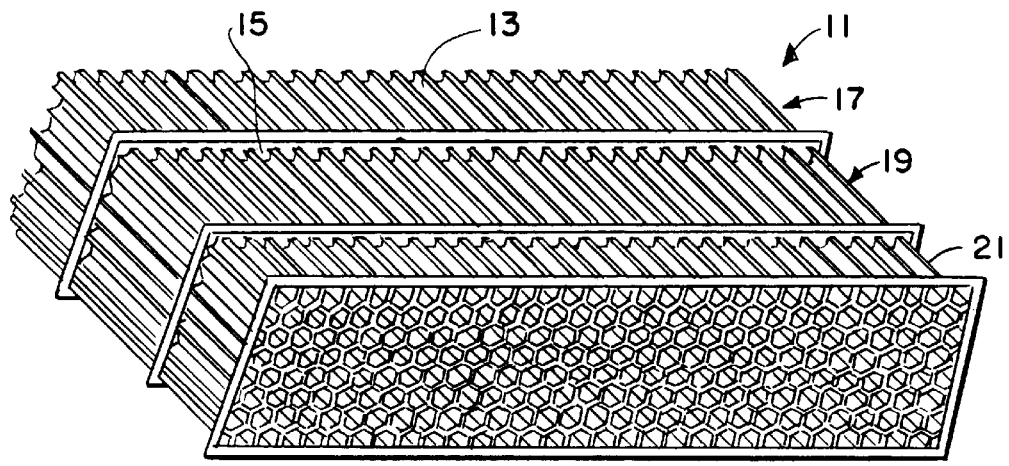
FIG. 2 is a representative honeycomb structure defining a major building block used in the construction of the chassis and other structural components of the vehicle.
Figure 3A:
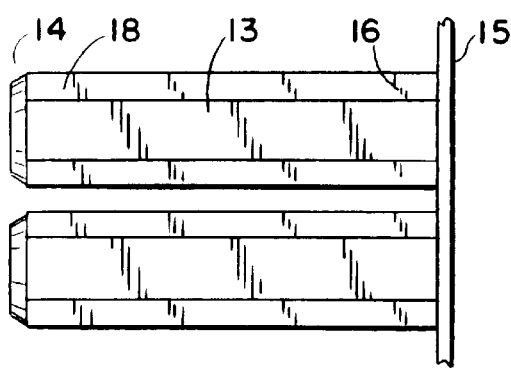
FIG. 3A is a side view of a pair of hexagonal extrusions making up the honeycomb structure shown in FIG. 2.
Figure 3B:
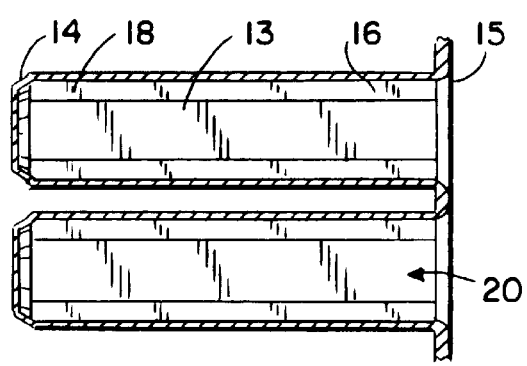
FIG. 3B is cross sectional view of the hexagonal extrusions shown in FIG. 3A.
Figure 4:
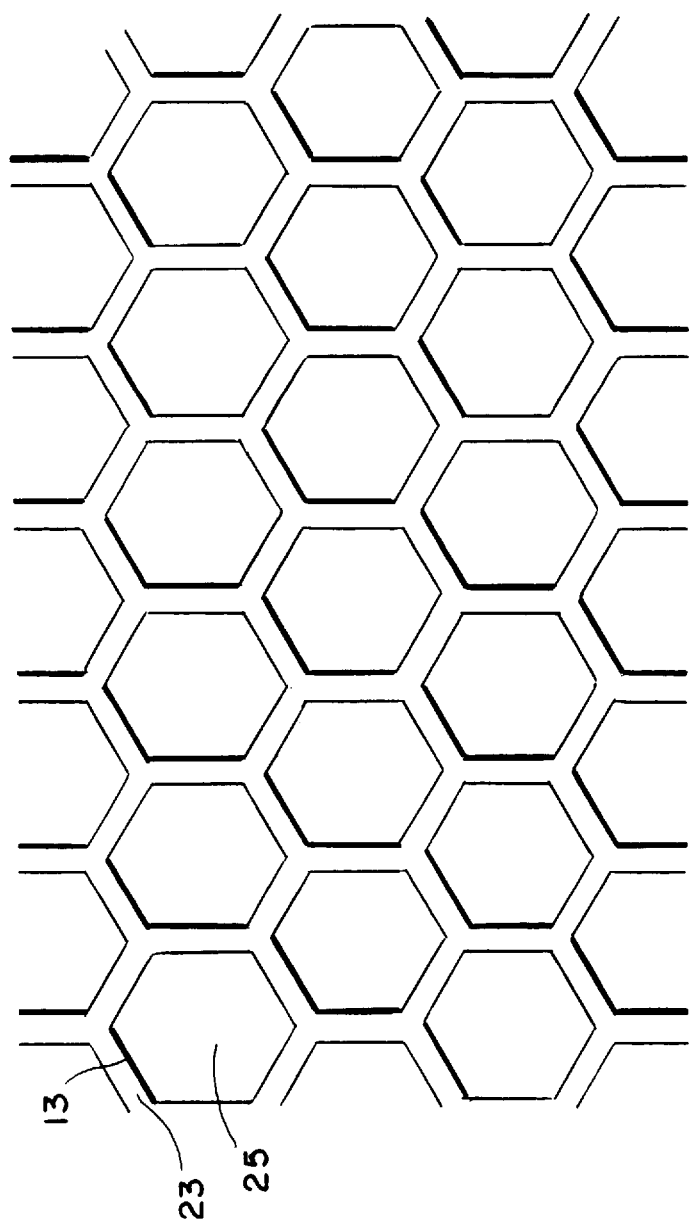
FIG. 4 shows, in a different scale, a region of the honeycomb structure shown in FIG. 2 as viewed from the front of the structure, i.e. as viewed axially of the hexagonal extrusions.

The EC composite is best understood by reference to FIGS. 2, 3A, and 3B. In FIG. 2, three separate honeycomb structures 17, 19, and 21 are joined together. Each structure 17, 19, 21 is comprised of a relatively thick, from ¼" to 1 ⅛" aluminum honeycomb base sheet 15 with projecting thinwall hexagonal extrusions 13. The individual hexagonal extrusions 13 may be formed by stamping, casting, superforming, or hydroforming the originally planar sheet of aluminum 15 resulting in the multiplicity of hollow hexagonal extrusions 13, approximately ¹⁄₁₆" thick, projecting from the base sheet 15. Since the extrusions 13 are formed from the material originally comprising base sheet 15 (except when formed by casting), the walls of the closed ended extrusions 13 are quite thin as evident by the thickness distinction shown in FIG. 3B which is a cross sectional view of the pair of hexagonal extrusions 13 shown in FIG. 3A. FIG. 4 is a front view of a portion of a hexagonal-cell honeycomb structure 11 showing the extrusions 13 with surrounding voids or interstices 23, each extrusion 13 having a hollow interior 25.

In this description, the term "extrusion" will be used to reference the hexagonal members 13, although, depending on the forming process, projections or protrusions would be better descriptive. Additionally, it will be understood that circular, triangular, or other polygonal cross sectional shapes for the extrusions can be used instead of hexagonal.

Like current composite technology, EC's are strong and lightweight having a strength-to-weight ratio between current automobile steel panel construction and aerospace aluminum panel construction. EC's are non-corrosive, non-conducting at their exposed surfaces, and tend to dampen vibration. They stand up well to abrasion and wear and are superior to aluminum in applications where the structure requires a controlled deformation response during catastrophic loads. EC's also differ from current composites by utilizing a low energy, and emissions, clean manufacturing system. This advanced composite can even be formulated from agricultural waste and use recycled materials. Moreover, EC's total manufactured cost is comparable to the cost of current stamped steel automobile production techniques. This is due to EC's low pressure, low friction hybrid molding system, minimal tooling costs, and low labor content. Environmental Composites are designed to be easily and economically recyclable using a process that is both low labor and low emissions intensive. EC's can be recycled a number of times with a minimal loss of strength.

The Prototype Process

During the prototype process, this technology will also give its user an advantage over current technology. Prototyping currently requires major tooling, large design and development stages, and hundreds of millions of invested dollars. The first of the Series 200 will be the X222 Roadster which is estimated to take 12 months and cost 10 million dollars, a vast improvement in saving of time and cost over current technology. This technology will utilize state-of-the-art and future production and design technologies more readily than current steel production i.e. such technologies as STEP digital tooling software (Department of Energy—Kansas City), rapid prototyping, the use of the Internet, and remote testing.

Definitions

As used in this description, the terms "honeycomb structure" and "honeycomb-cell structure" refers to the arrangement of a multiplicity of aluminum honeycomb extrusions 13 and may be of any desired length, width, or depth and may be used for fabricating the chassis, doors, interior decor items, etc.

The term "composite honeycomb structure" refers to the aforementioned Environmental Composite material comprising a plurality of extrusions 13 encapsulated and impregnated (around and between extrusions) with polymer, preferably, but not limited to, a thermoplastic. When the term "composite" is used in this description, it will mean the item is comprised of the aluminum/polymer composition.

The term "base sheet" indicates the side of a honeycomb-cell structure from which the honeycomb cells project. Although such a base sheet is typically planar, it may be formed into a curved shape before or after forming the extrusions 13, and it is to be understood that the base sheet is not limited strictly to a planar form.

The term "chassis parts" will refer to simple geometric-shaped composite aluminum/polymer members which may be adhesively connected or otherwise bonded together to form larger components of, for example, the vehicle chassis.

The term "chassis segment" refers to either an assembly of composite chassis parts mounted together or to a base sheet 15 with extrusions 13 and comprising a horizontal slice of the chassis, but having a depth longitudinally of the vehicle equal to the length of the extrusions 13 (preferably about 6"). A "composite segment" is a segment of honeycomb-cell structure and polymer material.

The term "bulkhead" means a major wall structure separating portions of the chassis at intervals longitudinally of the vehicle. A bulkhead may be an extruded solid piece of aluminum framework or may be the aluminum framework so described in combination with a plurality of extrusions 13 so that, in effect, the latter described bulkhead serves the dual purpose of a solid aluminum bulkhead for strength and yet constitutes one of the "segments" of the chassis. A "composite bulkhead" means a bulkhead that has been impregnated with a polymer.

The term "chassis section" means at least one chassis segment extending between bulkheads.

The term "major matrix" will refer to a combination bulkhead and segment as described above, meaning that this item of the chassis is intended to support a major part of the load and stress on the vehicle chassis.

The term "minor matrix" generally refers to the honeycomb-cell structure and typically is used synonymously with the term "segment".

The term "expandable polymer" may be referred to as an EP and is a type of polymer, to be described in detail later, which expands upon the application of electrical energy to it.

The term "post" indicates the vertical outside wall portion of the vehicle chassis, which outside wall portion, when bonded to adjacent outside wall portions, form a substantially vertical outside wall for the vehicle chassis.

The term "chassis wall" refers to a number of chassis "posts" bonded together to form a substantially vertical member extending from the floor of the chassis and which is needed, for example to support the windshield module or doors, and provides side walls for the engine compartment, etc.

In this description, the aluminum hexagonal cell structures forming the chassis, prior to being combined with the polymer, has the reference numeral 4 and may be referred to as a chassis subframe. The fully encapsulated and impregnated chassis uses the reference numeral 3. However, for ease of description, the numerals 3 and 4 may be appropriately referenced, and since, regardless of the methodology used to construct the fully encapsulated and impregnated chassis, the end result is substantially, functionally, the same. Accordingly, for convenience of discussion, hereinafter the chassis (either the subframe or the fully encapsulated and impregnated chassis) will be referred to with the reference numeral 3.

Recyclable Auto Chassis/Body

Along with this changing market demand to cut costs is another for superior safety, reduced operating costs, reduced environmental impact, and greater design adaptability. The invention employs an entirely new material, structure, and production system to create a superior vehicle chassis to fulfill these new market needs.

The polymer matrix composite honeycomb structure 11, shown in FIGS. 2 and 4 used in the construction of the chassis 3 is designed to maximize the strengths of polymers and aluminum and minimize their weaknesses. Polymers are easily and relatively inexpensively moldable into complex shapes using low friction molds. Aluminum is limited in its panel shapes, sometimes requiring multiple panels, but is very expensive to fabricate, requiring expensive tooling and close tolerances to be manufactured. Polymers have poor tensile strength but high compression strength. Aluminum has high tensile strength, and it is particularly hard to weld. Certain polymers have exceptional adhesive characteristics with aluminum. Thermoplastic polymers can be easily recycled without degradation providing they are not fiber reinforced or mixed with other polymers. Aluminum is highly recyclable with excellent recycling infrastructure in place. The present invention uses the same polymer, or recyclable-compatible polymers throughout the vehicle, whether a part of an EC aluminum/polymer modular section or not, e.g. where used as interior trim components.

Safety is designed into every facet of this composite structure. Its lighter weight gives the driver superior maneuverability to avoid accidents, and if he cannot, better braking to reduce the final collision impact speed. The built-in crush capability of this composite at all angles of attack reduces loads on the structure and spreads those loads to the internal aluminum structure. The configuration of the aluminum bulkheads 54A–54G, FIGS. 5 and 8–10, and the centerline backbone 31 are important safety features. In an off-center collision, which the majority of collisions are, i.e., in a collision accident where the vehicle's left or right front sections collide with another vehicle or stationary object, the bulkheads 54A–54G tend to collapse as does the composite honeycomb structure between them, redirecting the body during the momentum of the force away from the center of the car and thereby forcing the car away from the crash. In the standard steel frame automobile, the longitudinal strength of the vehicle is split between a pair of steel chassis side beams spaced from the center of the vehicle. In a similar collision accident, one of the steel beams will act as a pivot point to rotate the vehicle into, not away from, the object with which it collides. The centerline backbone structure 31, as in the present invention, is a necessity where the car will most likely be hitting vehicles twice its mass or more. Offset frontal crashes, the most common life threatening crash, are specifically dealt with by this structural capability of flexing and, in the ultimate test, the bulkheads will break away at the centerline thus driving the force away from the center. The aluminum bulkheads 54A–54G also reduce the chances of penetrating the protected composite aluminum/polymer matrices which have less tensile strength. Of course, the inherent strength of the honeycomb is exceptional. Additionally, the safety of the vehicle may be enhanced by adding a flame retardant to the polymer component of the composite.

Figure 7:
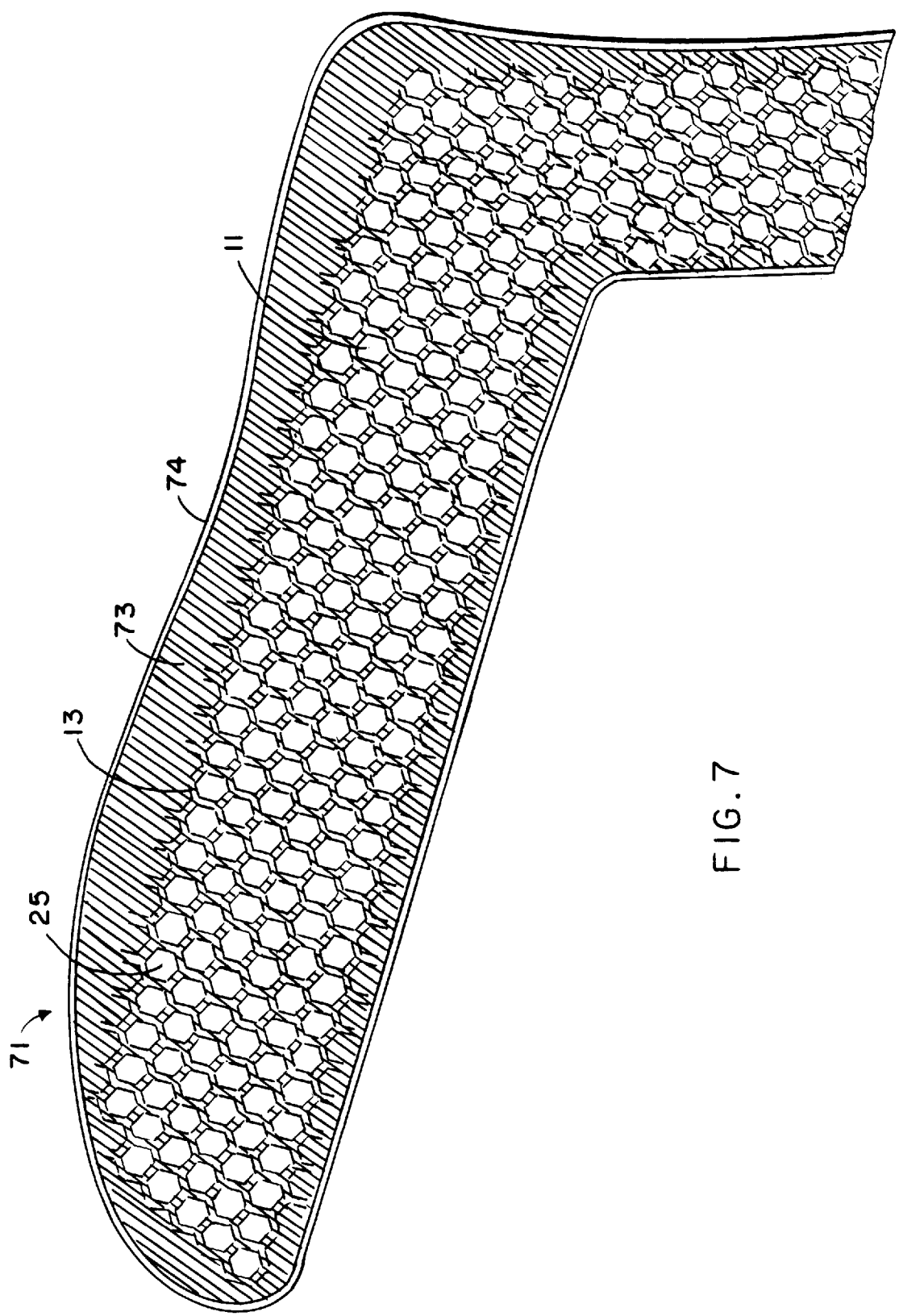
FIG. 7 is a transverse partial cross sectional view of a segment of a composite aluminum/polymer honeycomb structure having an outer skin of thermoplastic covering a polymer foam material permeated within and between the honeycomb cells.

The inventor's automotive technology utilizes an integrated structural design of seven different sub-structures creating one vehicle frame structure comprising: four chassis substructures including 1) a major aluminum/polymer matrix, or bulkhead, structure 54A–54G, 2) a minor aluminum/polymer matrix or chassis segment 41A–41G, 3) a laminated thermoplastic 74 and polymer 73 structure (FIG. 7), and 4) an aluminum/polymer sandwich configuration in the construction of the hexagonal-cell/polymer matrices; and three types of crush structures including 5) flexible foam bumpers 153, 164, 6) structural foam crush structures (see FIGS. 22–24 of the inventor's prior U.S. application Ser. No. 08/371,228), and 7) polymer/foam cones 119.

The preferred polymer for the EC is selected from the group consisting of polycarbonates ABS, reinforced liquid crystal polymer, polyimides, and combinations thereof.

An eighth structure can also be included in a variation of the polymer mix, where the body panels and interior panels are composed of a Poly-X/Polycarbonate mix that is stronger (60% Poly-X) than the inner polymer/aluminum chassis (20% Poly-X), thus creating, in effect, a macro-scale sandwich structure.

A ninth structure can also be formed by bonding two or more of these structures together creating a laminated structure which also includes the ability to have the directions of the various hexagonals oriented at different angles to the other laminates, thus creating superior strength in key areas.

The chassis 3 is composed of aluminum and advanced engineering thermoplastic. Due to this fact, the cost per pound of this aluminum/thermoplastic composite is estimated to be approximately $3.20, making it cost-effective for many applications for which composites could not be considered before due to their high cost. The aluminum chassis framework consists of a series of self-aligning aluminum bulkheads 54A–54G and chassis segments which fit together to create an aluminum subchassis 4. Each bulkhead 54A–54G and chassis segment 41 is fabricated from an aluminum base sheet 15, of various grades depending upon use, of approximately ⅜" thick aluminum sheet for segments 41 and ⅝" for bulkheads 54A–54G which are cut (stamped, cast, superformed, or hydroformed) out in the size and shape of full width bulkheads or segments such as those shown in FIG. 5. They have similarly formed central backbone walls 31 in each. They may be stamped using the same technology as aluminum beverage cans, but, for this application, a full honeycomb bulkhead 6" thick composed of hundreds of individual ¹⁄₁₆" thinwall hexagonal extrusions 13 (see also FIGS. 3A and 3B), all attached at one end 16 to the original ⅜" or ⅝" base sheet 15 from which the hexagonal extrusions 13 were created. The inside dimensions across each hexagonal extrusion side-to-side is ⅞". The sides of each hexagon are spaced ¹⁄₁₆" from the adjacent hexagon, making the outside dimension across each hexagon pattern 1". At the free end 18 of each of the honeycomb extrusions 13 is extruded an end fitting 14 which fits into each hexagonal cutout 20 of the next adjacent ⅜" or ⅝" aluminum base sheet 15 (see FIGS. 3A and 3B for reference to a similar construction).

Figure 8:
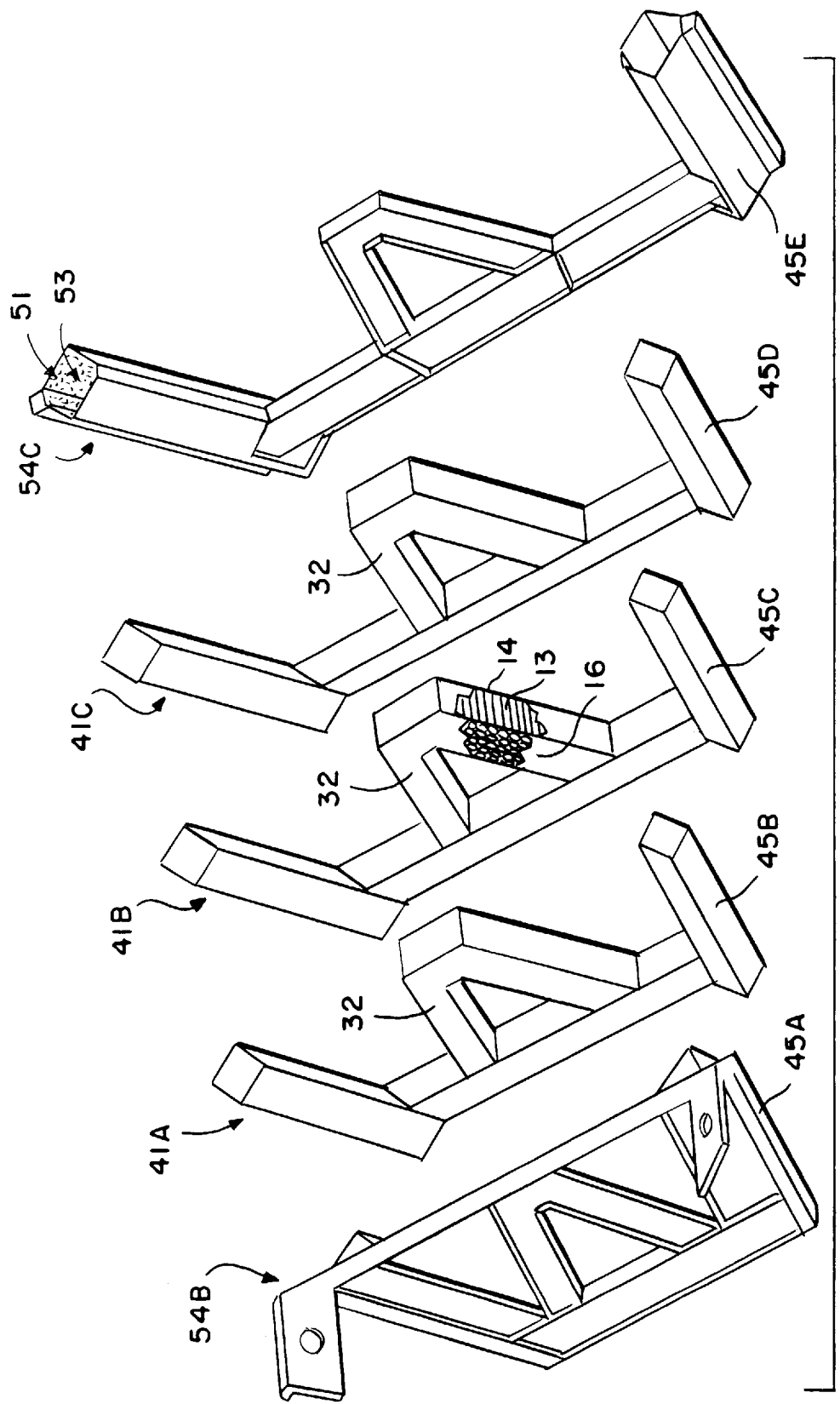
FIG. 8 is an exploded view of a series of composite chassis segments which are individually formed and then assembled adjacent one another and bonded together to construct a section of the vehicle chassis or optionally the entire vehicle chassis.
Figure 9:
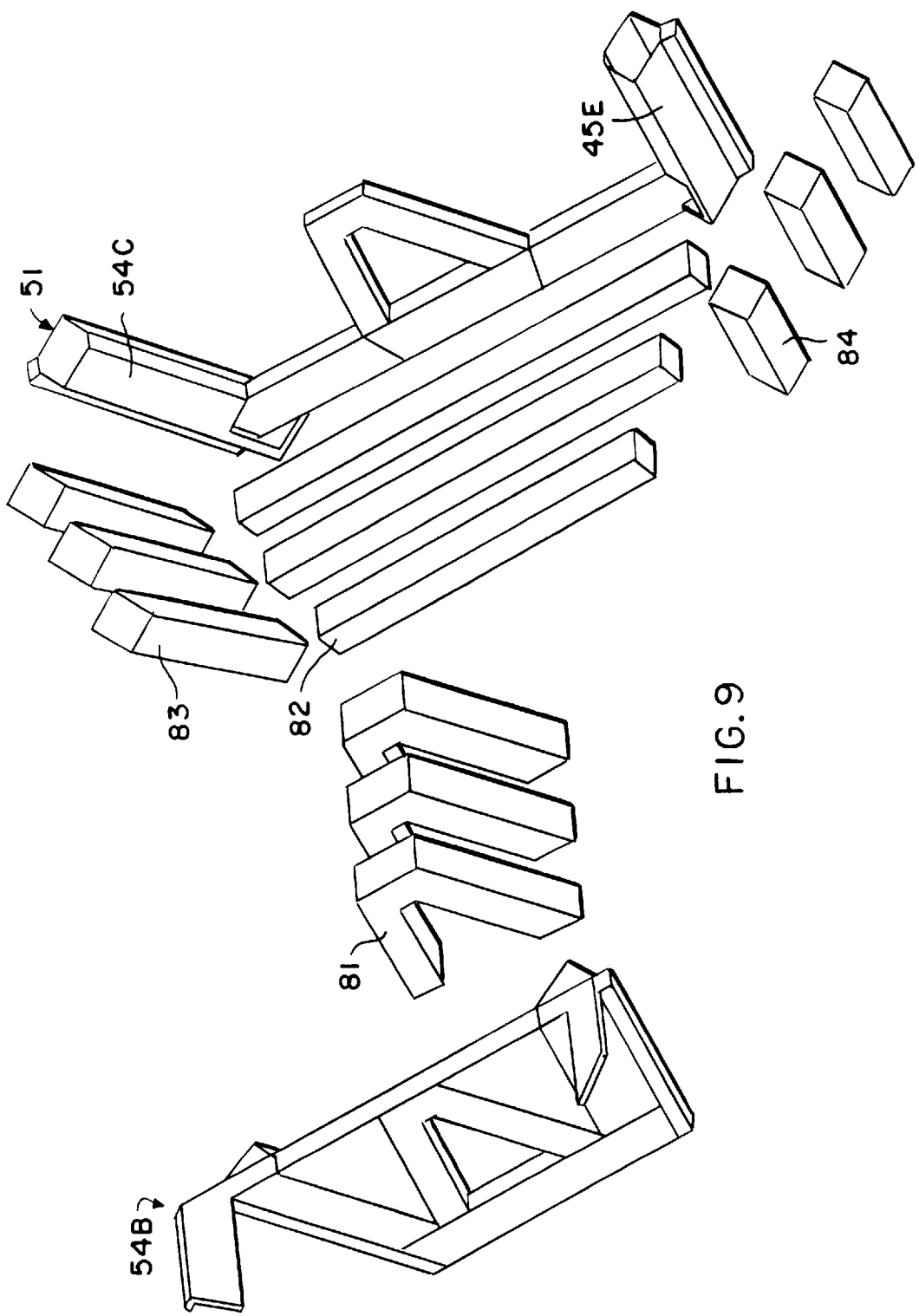
FIG. 9 is similar to the elements shown in FIG. 8, except that the individual parts of the chassis segments are individually completely formed before assembly and bonded together to construct the chassis segment, this type of construction being applicable equally to individually forming parts of a chassis section, and assembling and bonding them together to construct the chassis section.

As best viewed in FIG. 8, a number of minor matrix chassis segments 41A–41G fit between the major matrix bulkheads 54A–54G which are placed in key areas of the chassis where the major point loads are taken—front suspension, doors, engine and rear suspension. The particular bulkheads shown in exploded view in FIG. 8 comprise the intermediate front bulkhead 54B and front main bulkhead 54C between which segments 41A–41C are placed, the chassis portions between bulkheads 54B and 54C defining a fore section 43B. Similarly, the chassis portion between pairs of bulkheads 54A and 54B, 54C and 54D, 54E and 54F, and 54F and 54G define, respectively, nose 43A, mid fore 43C, mid aft 43D, aft 43E, and tail 43F chassis sections. The major matrix bulkheads 54A–54G utilize outer vertical end walls 48A–48E terminating in outer posts e.g. 45A and 45E configured as half diamond shapes which, when fused or welded together, form diamond shapes 51 which can be filled with polycarbonate foam 53 for added strength. The new construction uses seven major bulkhead matrices 54A–54G and fifteen minor segment matrices, e.g. 41A–41I creating one large aluminum/polymer honeycomb chassis structure 3.

The type of thermoplastic has been changed from Makrolone polycarbonate foam (Miles), suggested in the inventors prior U.S. application Ser. No. 08/371,228, to polycarbonate (GE Plastics and others) with 20–30% recyclable microspheres (e.g. microballoons by 3M). The glass microspheres are inexpensive and recyclable. They reduce weight by up to 30% and cost about the same as thermoplastic with little to no loss of strength. This creates a structure which is similar to foam but more uniform and thus superior in strength. This type of material, of thermoplastic and microspheres, is also used for the external body and interior cockpit molds but using a greater or lesser percentage of microspheres depending on the type of vehicle.

Several other types of thermoplastics can also be used, such as polyimides, among others, depending on structural and environmental demands applied to the structure. One of the strongest polymers for demanding applications such as a truck or bus chassis is Poly-X (Maxdem Inc.) a melt processible, high tensile moduli rigid polymer, new class of rigid-rod polymers known as self-reinforced polymers (SRPs) that provide significantly higher tensile moduli (a measure of the stiffness of a material) than competing plastic materials. Poly-X SRPs have moduli ranging from 1 to 2.4 million psi, over four times higher than those of conventional engineering resins, which range from 300,000 to 600,000 psi. These polymers are so far beyond the specific stiffness (stiffness divided by density) of normal polymers that Maxdem has compared them to several forms of structural metals. Until recently, other rigid-rod polymers could only be fabricated into spun fibers or cast films from an acid solution. Poly-X SRPs can be molded using injection, extrusion, and compression processes, thus permitting formulation of thick pieces and easier fabrication. For purposes where far superior strength is needed, the new material can be blended with the polycarbonate to increase the tensile modulus by 500% and tensile strength by up to 300%.

Rigid-Rigid Poly-X (Maxdem) is a member of a new class of polymers of thermoplastic poly (benzoyl-t,-1-phenelene). It is a transparent, amorphous thermoplastic having an isotropic tensile modulus of over 10 Gpa. Poly-X resins have exceptional hardness and strength, all attributable to the rigid-rod polymer content. Poly-X resins are unique in several respects. They have unprecedented isotropic tensile moduli. They are the only rigid-rod polymers that can be injection and compression molded. They are the only rigid-rod polymers that can be cast into strong films from organic solvents. Panels ranging in thickness from about 0.02–0.5 inches have been prepared by molding at temperatures between 280–350 degrees at pressures between 200–2,500 psi. Even though Poly-X resins and as-cast films dissolve in variety of solvents, molded samples tend to become largely insoluble. Studies of melt viscosity over time suggests sufficient melt flow to allow various processing techniques and have been tested for extrusion and injection molding. Poly-X resins are harder than any unfilled thermoplastic. In addition, properties relating to dielectric applications are good to excellent, including low dielectric constants, low moisture uptakes, and low CTE's. In addition to good solubility in some organic solvents, Poly-X is compatible with polycarbonate (PC). Transparent, homogenous films can be cast from chloroform solutions containing both Poly-X and PC. The films are transparent over the whole composition range.

Low cost Carbon Foam can also be used in key structural areas of the chassis or crush areas. It can be molded into sections that are then chemically vapor infiltrated with structural materials such as silicon carbide or others, then fitted and glued into key areas over the entire chassis, especially between the aluminum bulkheads of the current chassis configuration.

Varying density of the microspheres can be applied to maximize weight savings and strengthen certain key areas. Particle toughening technology for thermoplastics can be applied for superior strength for military applications. A variable density aluminum foam bulkhead can be used where the density decreases toward the center, and very dense where the suspension, engine, and doors are attached. Aluminum foam bulkheads are estimated to weigh one-ninth the weight of cast sections. The bulkhead itself could be fabricated thicker toward the center for increased strength. The aluminum sheet can be fabricated thicker toward center for same effect.

Alternatively, Poly-X (Maxdem) can also be used in only key areas of the chassis and body rather than be blended into it. Or, the blends could be different in key parts of the body or chassis applied during the injection process. A 100% Poly-X body for a jeep could offer superior ballistic protection. Front, back, door panels, and rollbar could be total or higher percentage Poly-X. Alternatively, a thinwall steel honeycomb could be used to replace an aluminum matrix structure. Magnesium could also be used. Alternatively, Poly-X with microspheres of varying densities can be used for different areas.

Alternatively, thinwall steel could also be used for special applications. The thinwall steel would be preferably approximately 1/32nd inches in thickness and ribbed or with a micro hex pattern embossed in it for strength and added adhesion to the polymer. Ultra-thin steel castings/stampings for the major bulkheads would replace the aluminum major bulkheads.

The chassis designed for the Series 200 two-seater is termed the "E" chassis, where the bulkheads form an "E" shape when laid on their sides. For the smaller wheelbase Series 100, a "W" chassis has been designed in which the chassis bulkheads have a "W" shape. This latter series has a small engine and drive arrangement underneath the floor of the vehicle with the centerline, also under the floor, having the fuel tanks molded into it. This same "SW" configuration has also been developed for the longer wheelbase bus and light rail chassis where the front hybrid-engine attaches directly to the centerline section. The cross section of the bulkhead section can be varied from 3 inches to up to 12 inches for other vehicle applications which increase the hexagonal aluminum extrusions in the same ratio.

This technology offers a very special capability for the chassis—the chassis 3 can easily be lengthened or shortened with low costs for different bodies by just adding or subtracting polymer and aluminum bulkheads 54A–54G before final molding. The width of the chassis can be changed by adding or subtracting hexagonal extrusions for the aluminum/polymer bulkheads between the center backbone 31 and the side edges 33 of the chassis 3.

Variations in bulkhead design include foam filled diamond shaped major bulkhead post structures e.g. 45E for extra strength. Varying the thickness of sheet aluminum used to fabricate a bulkhead may beneficially serve to selectively create a thicker wall thickness for the centerline backbone hexagonal extrusions 31 and thinner, lighter hexagonal extrusions outboard toward the edges 33. Use of aluminum foam technology for the aluminum bulkheads will create bulkheads 1/8th the weight of solid aluminum.

Production

The inventor's technology includes a clean manufacturing system that cuts waste, energy, and emissions. Current steel chassis and body manufacturing is a major source of waste, emissions, and user of energy. The inventor has developed a clean manufacturing system for producing automobiles that virtually eliminates spot welding, drilling, and most finishing, thus slashing energy use, production waste, and emissions. The advanced system significantly reduces the huge investment usually required in plant and equipment and shortens lost conversion time.

Work injury costs millions of working-days a year. The inventor's technology requires a far simpler and more worker friendly, low impact, low noise, and low emissions manufacturing system which inherently significantly reduces work injuries.

The cast aluminum major matrix bulkheads designated in the inventor's earlier U.S. patent application Ser. No. 08/371,228 are replaced with stamped or hydroformed 5/8" thick aluminum major matrix bulkheads 54A–54G of similar configuration except for their microstructure design. Instead of having cross braces designed in, now the bulkheads have 7/8" ID hexagonal by 6" deep stampings designed into the bulkhead in the same configuration as the honeycomb configuration (FIG. 2) of the minor matrix chassis segments 41. For larger vehicles such as trucks, these sections can be inserted into precut area of the composite similar to the use of tubes in the aforementioned earlier patent application Ser. No. 08/371,228. These large aluminum structural members can then be fused to the composite using an ultrasonic bath or glue. The bulkheads are now comprised of two sections, either cast or stamped, that are either glued or fused together. The outer wall or post sections are half diamond shapes which are fused or welded together to form diamond shapes (which can be filled with polycarbonate foam for added strength). The aluminum tube subframe is now eliminated altogether, replaced with a series of self-aligning bulkheads.

Figure 5:
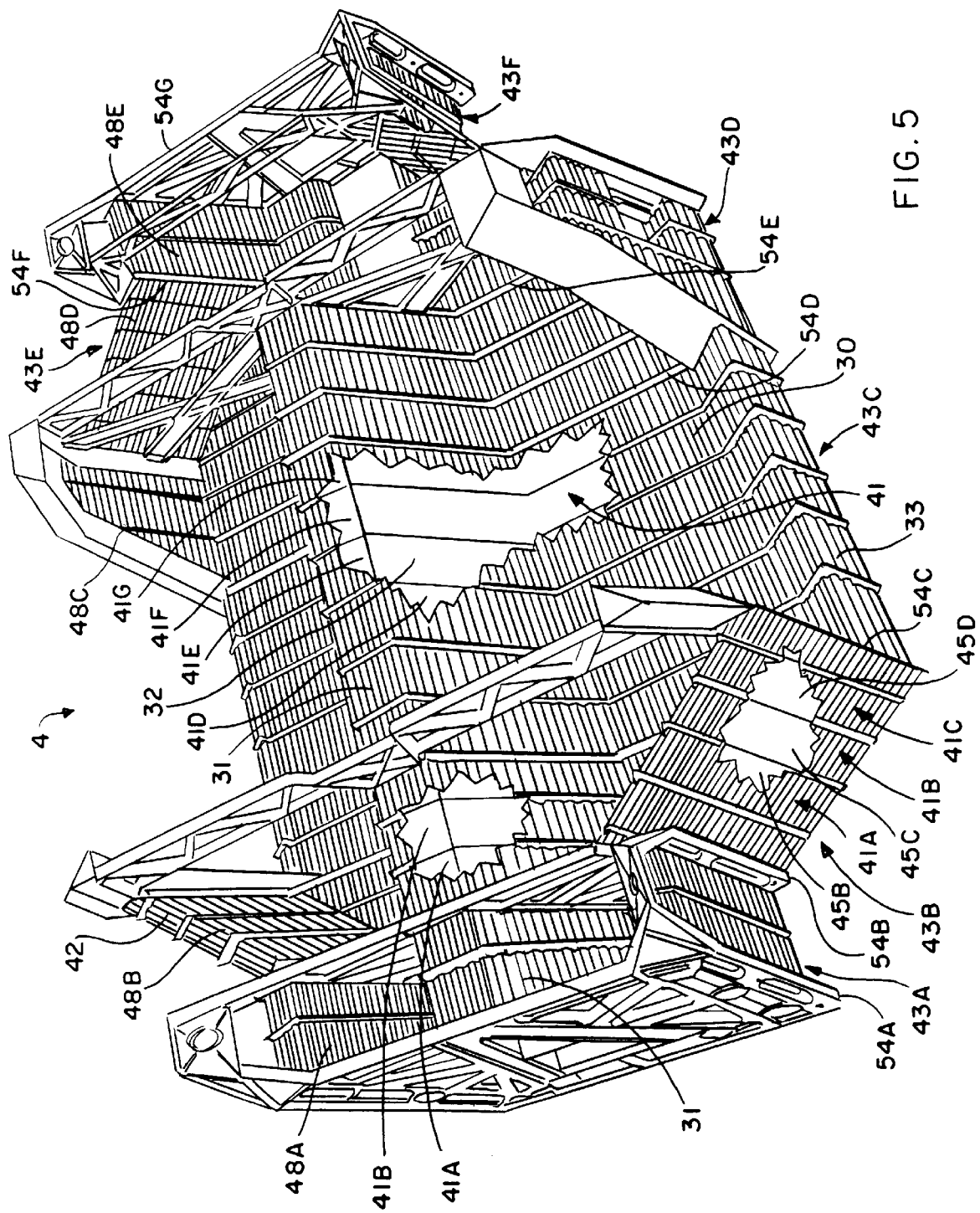
FIG. 5 shows a completed vehicle chassis constructed of aluminum honeycomb structures connected together prior to encapsulation by a polymer, and further shows in a breakaway format an alternative construction of the chassis in the form of multiple completed composite aluminum honeycomb and polymer segments joined together after each composite segment is fully formed.
Figure 6:
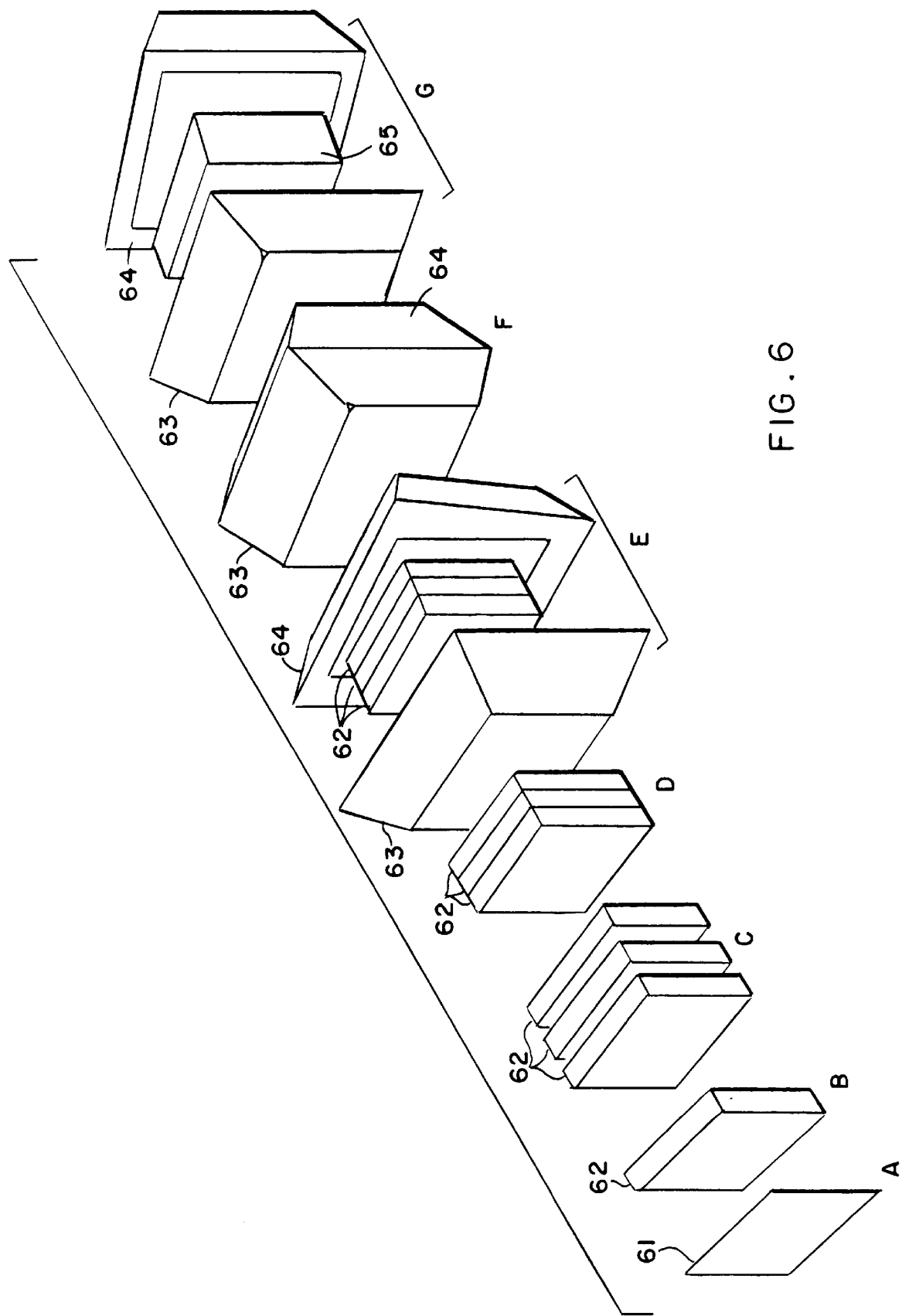
FIG. 6 is a schematic representation of the different steps in the process of forming a completely encapsulated aluminum honeycomb and polymer module, the process beginning with a sheet of aluminum and finishing with the completely molded aluminum/polymer composite, the process steps shown being exemplary of fabricating any composite aluminum/polymer body including an entire vehicle chassis, chassis sections, chassis segments, chassis parts, and others.
Figure 10:
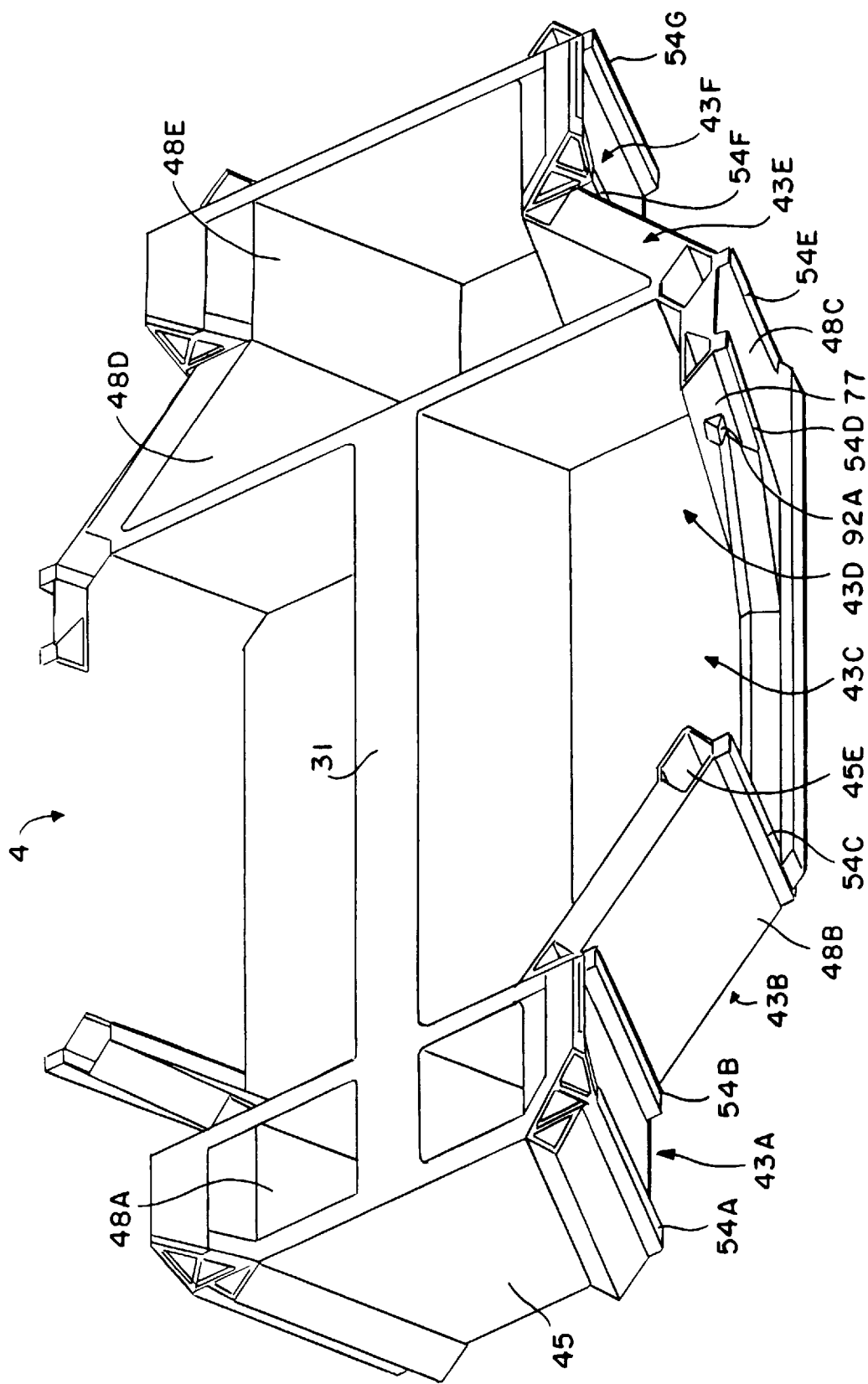
FIG. 10 is an illustration of a completed chassis (slightly alternate in design from that of FIG. 5) after the stacks of aluminum honeycomb structures are connected and after the thermoplastic has been formed in and around the hexagonal extrusions of the honeycomb structures.

Instead of sliding the hexagonal section over tubes to construct the chassis before impregnating it with thermoplastic, as was the case in the early system according to the inventor's copending U.S. patent application Ser. No. 08/371,228, the new construction uses six stamped or hydroformed aluminum honeycomb sections 43A–43F as seen in FIGS. 5 and 10.

The extruded chassis segments 41 are robotically stacked one against the other to form chassis sections 43A–43F, then stacked between respective cast or thicker major matrix bulkheads 54A–54G, then compressed to snap together completing the full chassis subframe 4.

The completed aluminum chassis subframe 4 is mounted into a chassis mold (not shown) which is closed and saturated in an ultrasonic bath. All fitted aluminum surfaces vibrate at high frequencies, heating and welding them together. The ultrasonic bath is turned off, and while the chassis is still close to 300° F., a vacuum is induced, and molten polymer (e.g., polycarbonate/microsphere melt) is introduced and vacuum pulled through the entire aluminum substructure. A low frequency vibration can also be applied to the mold and chassis to facilitate the flow of the melt throughout the mold.

Then the mold is moved on where it is lightly sprayed with water, cooling it for approximately ten minutes. The mold is then opened and the completed chassis 4 (FIG. 10) is pulled out and left to cool further for approximately 60 minutes. The mold is then used again. Later the molded chassis 4 begins its second phase of production, the assembly process (discussed in detail hereinafter).

Another faster cycling and lower cost (especially useful for the Third World) alternative production system is to use the hydroformed or stamped thinwall aluminum matrix but without using an ultrasonic bath to connect the various segments 41 and sections 43A–43F of the chassis subframe 3. Instead, a number of polymer matrices approximately 6" thick polycarbonate/microsphere injected parts 81–84 configured with ⅛" walled honeycomb pockets are produced. There are four different types 81–84 of these part molds to complete a Series 200 chassis segment 41, a center backbone part 81, an elongated floor part 82, a right side vertical post part 83, and a left side vertical post 84. These then have applicable aluminum matrices slid into each and glued into each; then the combined aluminum/polycarbonate parts 81–84 are fitted together with glue then compressed to fit, or ultrasonically welded together. An alternative version is to apply the applicable aluminum matrix to each matching polymer matrix then fitted and compress to fit together. Then an ultrasonic bath is applied to weld the aluminum matrices together; then a radar bath is applied to melt the surrounding polymer to all aluminum surfaces. This eliminates the need for larger scale injection equipment and speeds the injection and cooling time.

Several types of injection mold layout can be used. One is horizontal where the flow is pulled by a vacuum or pushed by an injection pressure that can also be aided by gas injection to push the polycarbonate melt through the aluminum matrix assembly. The second places the mold on its end whereby gravity facilitates the vacuum injection process.

The aluminum matrices are stamped, then stacked in proper order, then aligned and compressed. Here, they can also have adhesive applied, or they can be bathed in an ultrasonic bath to melt all touching aluminum surfaces together. Then the polymer melt is injected, and, upon completion, the mold is cooled and removed to be reused.

A further alternative method of construction for the aluminum bulkheads is to blow mold the hexagonal tubes as single units resembling hexagonal aluminum cans, then robotically press fit each of these tubes into their respective hexagonal cutouts in aluminum sheet bulkheads.

As alternative fastening systems for the aluminum subchassis: first is an ultrasonic welding bath; second is the use of recyclable adhesives; and third is not to use an adhesive at all, because there is so much surface area molded over by the highly adhesive polycarbonate, the aluminum-to-aluminum bonding may not be needed in some applications.

Polymers need molds to control flow and shape. That is the basis of injection and compression molding. Complex molds become expensive to make and create flow and separation and cleaning problems during manufacturing. The inventor has solved all these problems by using part of the mold itself to be molded in as a metal matrix reinforcement to the polycarbonate which creates an aluminum/polymer sandwich structure.

Variations in manufacturing include building the chassis in two or three sections then fitting and gluing them together reduces mold and production cycle time and cost. These smaller precast sections are then set up between the aluminum bulkheads and put in the final mold to be fused together. If nitrogen injected polycarbonate foam is used instead of microsphere added polycarbonate, one can inject foam over the structure under high pressure, and the mold itself is already heated. Where the foam touches the heated mold, it will be much more dense and form a Class A finish, all in one stage rather than two.

An alternative step is the use of Gas Injection Molding. This relatively new process uses a gas such as nitrogen to push resin through twists and turns in complicated mold channels, creating hollow sections where needed and variable thickness in the adjacent sections in the same mold, and producing stiff lightweight parts. This process is a combination of blow molding and injection molding. To mold the part, a short shot of melted plastic is fired into the mold, followed by the gas. The gas pressure stays in the part during cooling, then is vented before the mold is opened. The gas has to have high enough pressure to push the resin through, but low enough pressure so that its does not blow unwanted holes in the resin. There are several injection systems that can be used for production: 1) a one piece chassis or a chassis made of large parts; 2) inject all or three large parts; 3) inject smaller cross sectionals and layers; and 4) all or chassis and separate body panels.

This technology is capable of virtual tooling and virtual molding. That is, the molds can change shape in a limited manner over a few minute period with the use of small movable sections controlled by electrically activated Expandable Polymers (EP) controlled by a dedicated computer software system.

Once saturated, the mold is moved on to a cooling area where, after cooling, it is opened and the fabricated chassis is removed. Then the mold is checked/cleaned and returned for another injection.

Due to the fact the chassis, body, interior, and various other major components of the vehicle are molded, Varicode part ID or other parts numbering systems can be molded into each part, thus enhancing smart manufacturing systems, eliminating the growing threat of counterfeit parts, and making the vehicles harder to steal, dismantle, and sell.

By digitizing the production of the vehicle, using materials and processes that can be completely computer controlled, the vehicle production system can then use an all-computerized system using current technologies including: Computer-integrated manufacturing (CIM); applying information technology to production processes and organizational structure to streamline operations; focusing on integrating systems and processes distributed across a company, such as order entry, scheduling, and production assembly; computer-aided design (CAD); high-performance design workstations that enable designers to manipulate parts diagrams and simulate operations, among other things; linking to computer-aided manufacturing systems; computer-aided manufacturing (CAM); systems designed to facilitate manufacturing, including computer numerical control (CNC), robotics, materials requirement planning (MRP), and process control; computer numerical control (CNC); a means of operating production machines (most commonly punch presses and machining equipment) by numerical-control instructions generated by CAD/CAM or from a programmable logic controller (PLC); programmable logic controller (PLC); a simple computer capable of coding, storing, and downloading numerical-control instructions to multiple machines without the use of tapes or punch-card readers; materials requirement planning (MRP); planning system for production operations that includes scheduling, materials, billing, and inventory management; manufacturing resource planning (MRPII); an expanded approach to MRP that also considers issues such as purchasing and forecasting.

Figure 16:
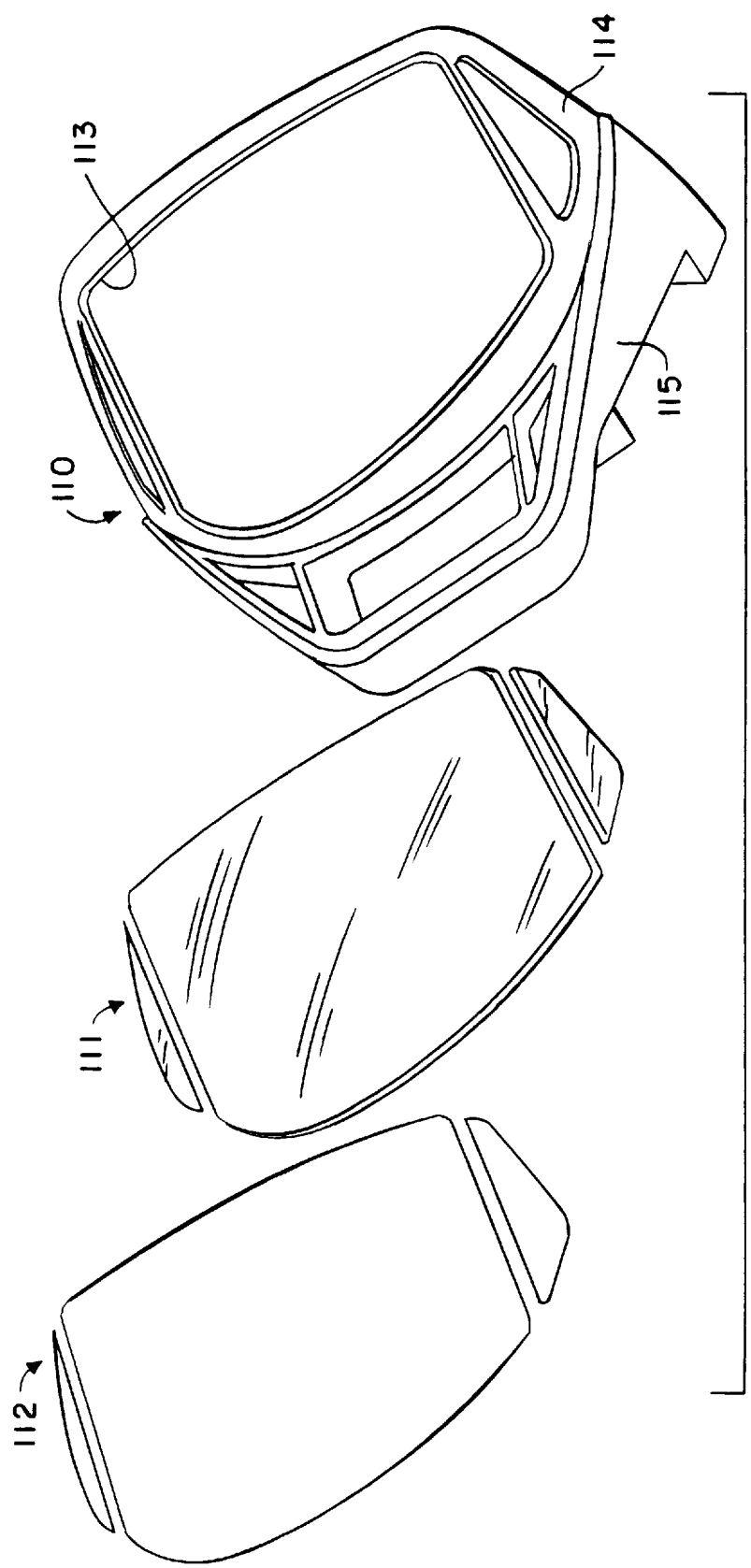
FIG. 16 is a perspective view of the windshield/rollbar frame structure and the safety glass inserts therefor.
Figure 18:
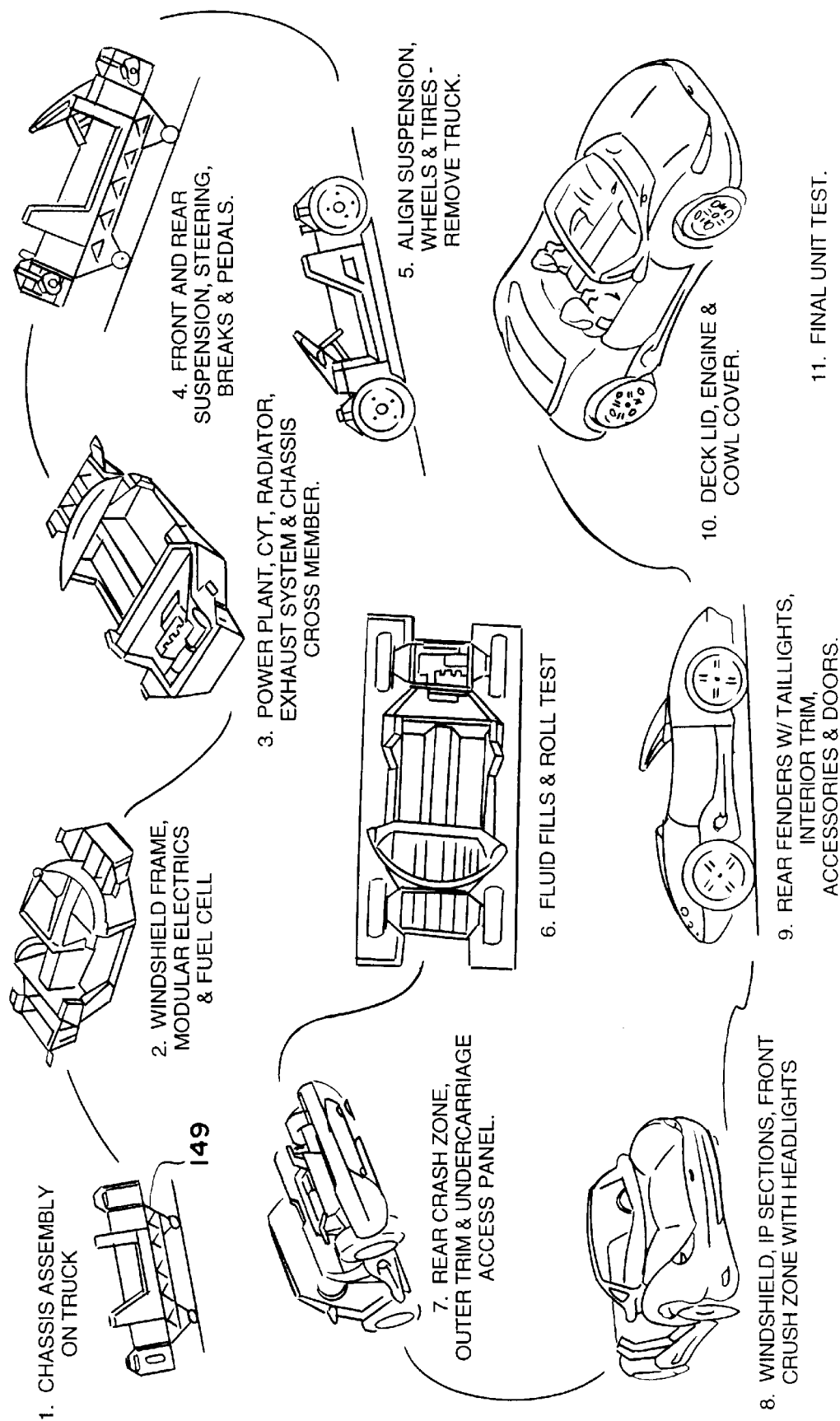
FIG. 18 is a pictorial representation of the various stations in the assembly process for the vehicle made in accordance with the present invention.
Figure 19:
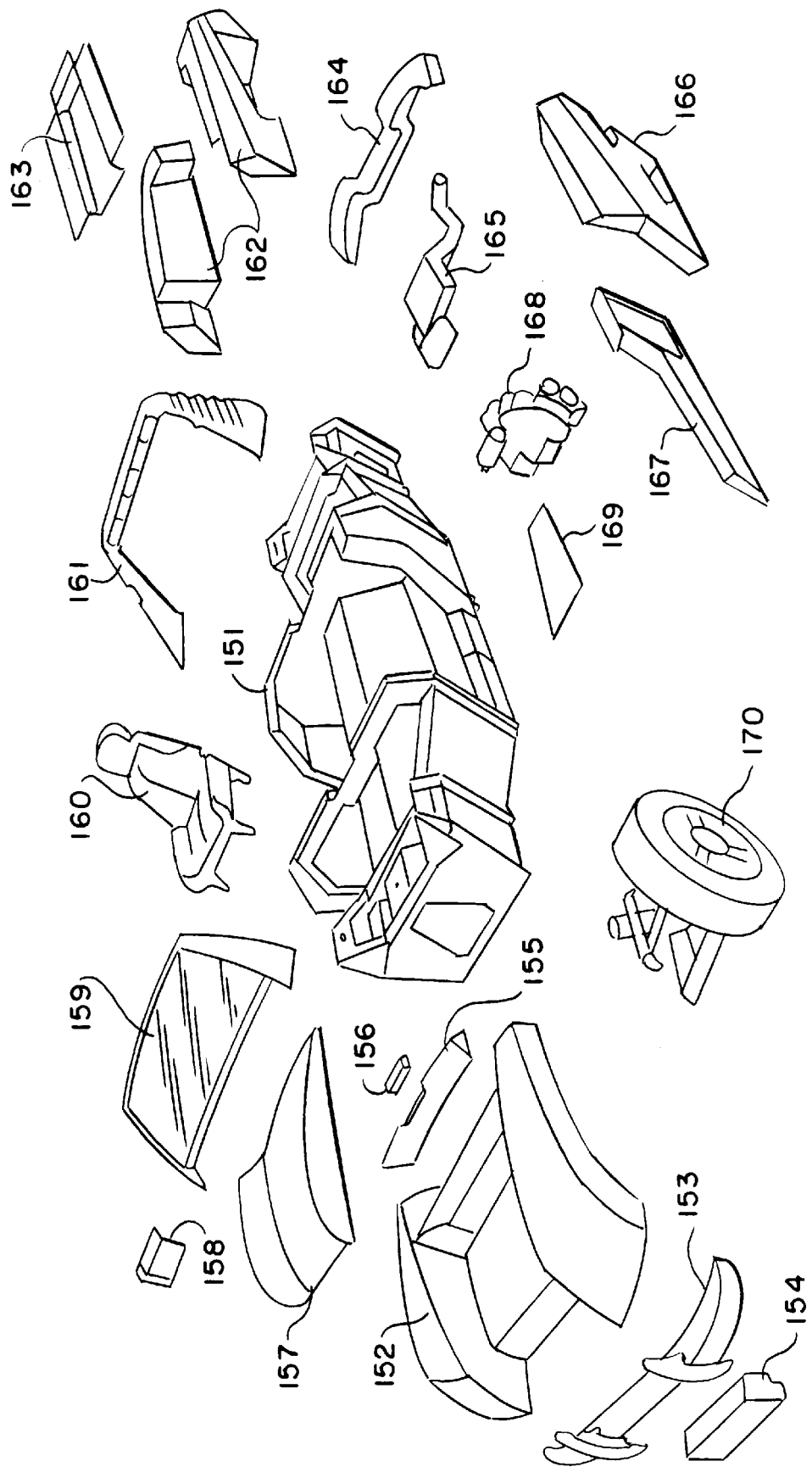
FIG. 19 is an exploded view of the various components of the vehicle made in accordance with the present invention.
Figure 20:
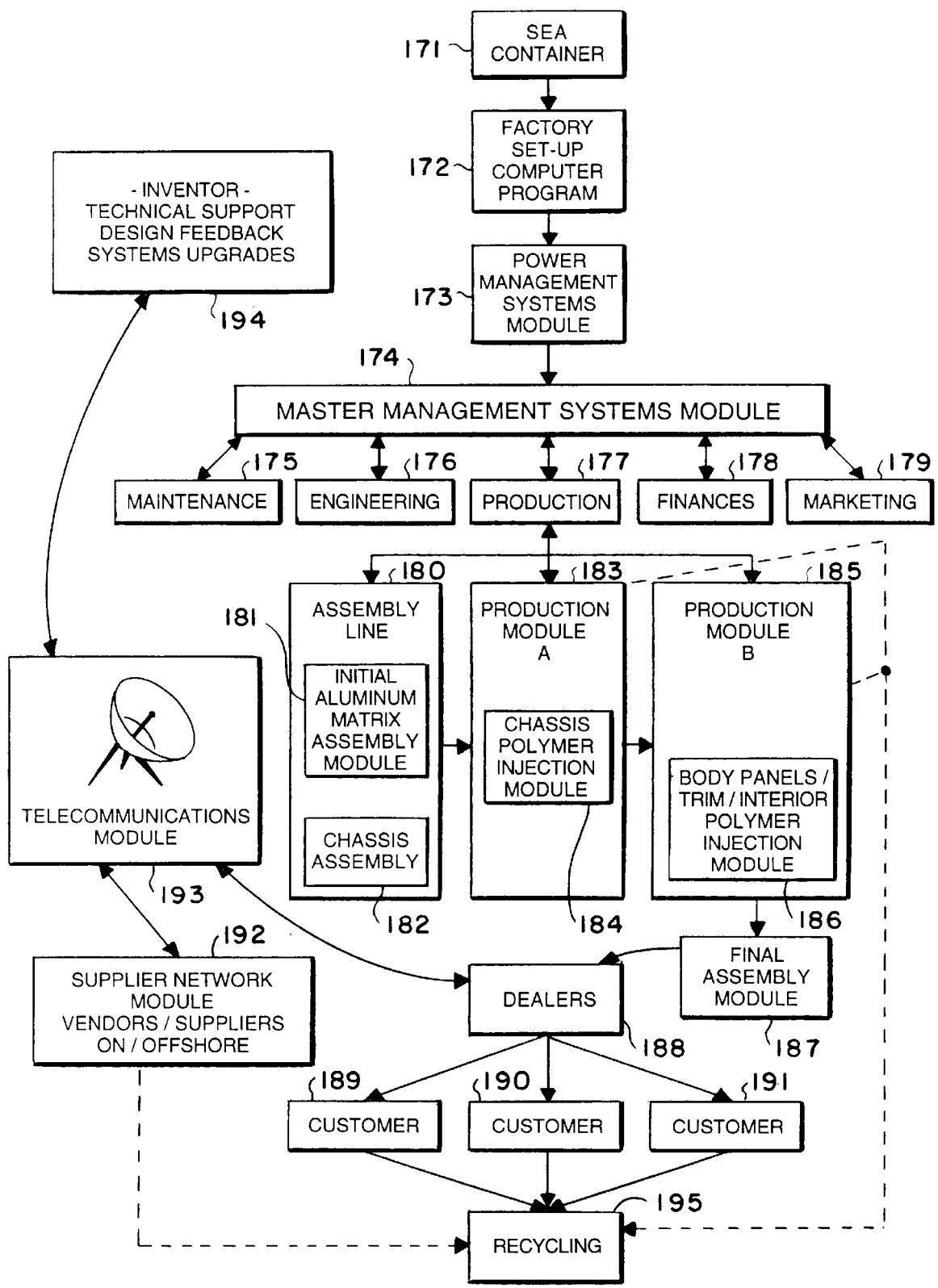
FIG. 20 is a block diagram of the modular production cell (MPC) system showing the various steps from setup to production, marketing, and recycling of the vehicle.

Assembly Process (FIGS. 16, 18, and 19)

Station 1. Once the chassis 151 is removed from the molding system, it is placed on a small truck 149.

Station 2. The windshield module 110 is glued in place. The modular instrument panel, electronics, and fuel cell are installed.

Station 3. The powerplant 168, CVT, radiator, exhaust system 165, and chassis cross member are'installed.

Station 4. Front and rear suspension 170, steering, brakes, and pedals are installed.

Station 5. Suspension is aligned; wheels and tires are installed and aligned; and truck 149 is removed.

Station 6. Fluid fills and roll test are performed.

Station 7. Rear crash zone, outer trim, and undercarriage access panel 169 are installed.

Station 8. Windshield 111 and windshield frame 112, instrument panel 155 and computer 156 sections, front crush zones with headlights 158 are installed.

Station 9. Rear fenders 162 with taillights, interior trim, accessories and doors 166 are installed.

Station 10. Deck lid 157 and engine & cowl cover 152 are installed.

Station 11. Final unit is tested.

The exploded view of the vehicle components shown in FIG. 19 include; chassis 151, pontoon fenders with package shelf 152, ballistic composite bumper 153, accessory pack 154, instrument panel and electrics 155, computer module 156, optional hood 157, headlight, mirror, and turn signal assembly 158, folding roller windshield 159, ballistic composite seat 160, roller bar lights, seatbelt mounts, air intake with sensor rack 161, pontoon fenders 162, engine access panel 163, rear bumper 164, composite exhaust 165, door with steps 166, dry cell battery panel in rocker (removable) 167, orbital two stroke two cylinder engine 168, under carriage access panel 169, and retractable suspension 170.

MPC System—Modular Production Cell System

The inventor has developed a self-contained automobile micro-factory built in easy-to-construct modules that can be shipped by ocean container, uncrated, and easily set up anywhere in the world. The Modular Production Cell (MPC) is designed to capitalize on America's world leadership in advanced technologies including software, materials technology, and agile manufacturing. The MPC System is composed of a number of interconnected modules which plug into each other to enable monitoring and communication with each module.

Once the two dozen shipping crates containing the MPC system have arrived at the proposed production site, the very first module to be opened is a user-friendly Factory Set-up Computer Program. This is roughly comparable to the install program used in home computers. The program will automatically tell how to set up the entire MPC and will automatically check all connections and software interfaces as assembly of the system progresses.

Next to be implemented is the Power Management Systems Module which automatically upgrades the local electric power grid to the MPC's needs and protects the equipment from brownouts and surges. The Master Management Systems Module includes computer hardware and software that connects and controls all phases of production. Its bundled software utilizes built-in artificial intelligence and fuzzy logic and has quick change multi-lingual capabilities.

It includes all the necessary production, finance, engineering, maintenance, and marketing software to manage the factory. Once these modules are set up, connected and checked, the basic production system can be uncrated and connected.

The inventor has developed a special vehicle, the Third World SuperCar Series, to be built expressly using the MPC production system. All major chassis components are composed entirely of an aluminum and advanced polymer composite material creating lightweight, inexpensive vehicles. This production system does not use stamped, cast, or welded steel panel production equipment, thereby eliminating the need for massive investment in stamping, welding, and alignment equipment, and the multi-year construction time.

The elements of the MPC production system include the Initial Aluminum Matrix Assembly Module 181 where the aluminum sheets are hydroformed into major and minor matrix bulkheads, the Chassis Assembly Module 182 where the major and minor matrix bulkheads are stacked, aligned and compressed then ultrasonically welded, two Integrated Polymer Modules 183, 185 where, in the chassis polymer injection module 184, the aluminum subchassis is placed in a mold and injected with a polymer mix, and the Final Body Panels/Trim/Interior Assembly Module 186 where the completed aluminum/polymer chassis subassembly is equipped with the windshield, electronics, fuel cell, powerplant, CVT, radiator, exhaust system, front and rear suspension, steering, brakes and peddles, suspension alignment, wheels/tires, fluid fills, rear collision zone, outer trim, instrument panel sections, front crush zones with headlights, rear fenders with taillights, interior trim and doors, deck lid, and engine & cowl cover, and a Final Assembly Module 187 where final unit tests are performed. A Telecommunications Module 193 is set up which includes a satellite dish and encryption software to communicate with dealers, vendors and the inventor for engineering and technical support, design feedback, and systems upgrades. The Inventor module 194 includes interface software to an administration site (at the inventor's location) where the inventor offers technical support, access to a knowledge library, design and development feedback, and system upgrades. A Supplier Network Module 192 includes hardware and software to interface suppliers, both local and offshore, with the MPC. It includes STEP software to assist in-country parts stream and production.

A Dealer Module 188 employing hardware and software to interface MPC with dealers around the country includes a customer-based computer rapid ordering system to service various customers 189–191.

Lastly, the MPC includes a Recycling Module 195 which strips, compresses, heats, and separates the advanced polymers and aluminum and pelletizes the recycled polymer, of old and damaged automobiles so they can be reused by the MPC.

All modules are easy to set up and plug easily into each other to monitor and communicate with each module similar to Apple hardware and accessories. Computer equipment concepts are used throughout the system. The system is designed for continuous improvement and upgrading.

Vehicle Body

The vehicle according to the present invention may have a "virtual" body that will allow new models and variations to appear on a yearly or even monthly basis with little extra cost. This body is inherently inexpensive, lightweight, and strong. Each body model offers add-on accessories such as aerodynamic fins/lips, trim, interior panels. This also allows the use of variable body panels which lends itself better to this construction system—body sections can be changed by owner—turning the basic car into a convertible, station wagon or light truck—with various body panels kept in the garage.

The "virtual" body offers better aerodynamics. Venturi air ducts are carved out of the underside of the vehicle. Air spikes around the windshield eliminate window washers. Grooves may be molded into the under aft section to align the air to give it more control, thus cleaning up the after edge turbulence and creating more suction. An option is to mold a slot in the rear section to shoot air up and lengthen the air stream of the car.

The "virtual" body is also lighter. The thermoplastic car panels can be considerably lighter than the thermoplastic currently used in today's steel chassis, because they are supported along their entire surface by structural foam and have a cross hatch design molded on the inside surface.

The "virtual" body offers more safety and security. The body itself carries a serial number molded into the lower corner of several body panels.

Windshield/Rollbar (FIG. 16)

The body uses a hardened polycarbonate windshield module 110 which is attached both to the front major aluminum bulkhead 54A and the aluminum windshield support 54G creating an A-frame rollbar. The windshield rollbar comprises two extruded aluminum A-frame structures 114, 115, one A-frame 115 whose base is fitted and glued into the forward chassis bulkhead 54A and whose side members are fitted and glued into the front door bulkhead 54C. Further stiffening is provided by a convex windshield 111 which is molded out of 80% Poly-X (Maxdem) and 20% Polycarbonate (GE Plastics). The outer edges of this windshield 111 side windows are designed to fit tightly into an extruded side edge 113 of the aluminum extrusion. Over this is fitted and glued a one piece aluminum frame structure 112 of similar proportions. This all combines to create an extremely strong polymer-aluminum rollbar windshield.

Figure 15:
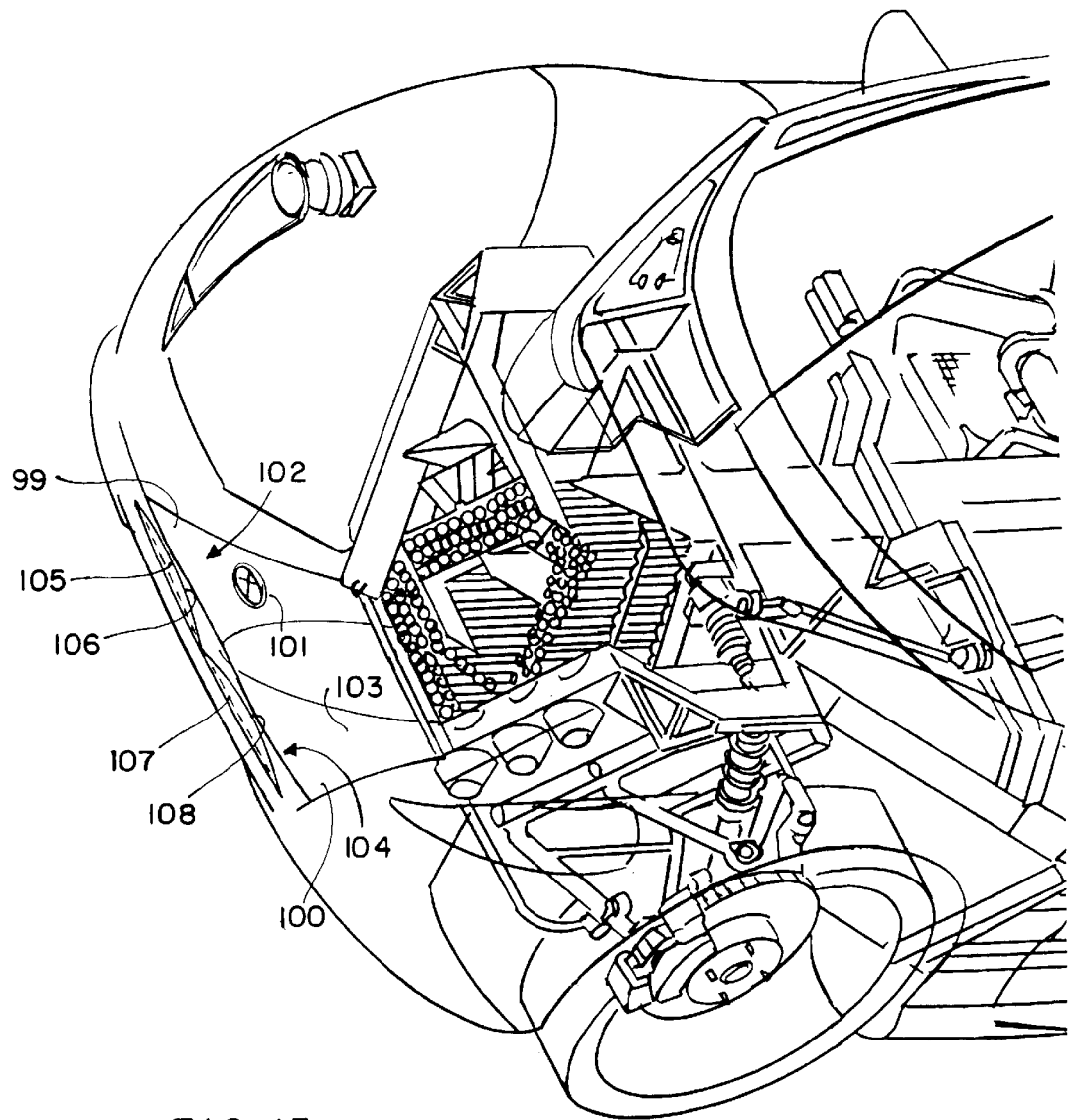
FIG. 15 is a perspective view the front of the vehicle showing the frontal air dam devices.

Active Aerodynamics—Virtual Air Dam (FIG. 15)

An air dam may be used for the control of air surfaces affecting downforce in the front of an automobile, based on Rensselaer Polytechnic Institute "Air Spike" concept which was developed to reduce drag and heat transfer at hypersonic flight. The invention utilizes a computer controlled series of high pressure air jets 101, 103 built into the leading edge of an automobile, which can have the air jets angled through an arc of 30 degrees under control of an expandable polymer air direction and flow adjust controller 106, 108 varying the thickness of the upper lips 102, 104, which not only creates a boundary layer reducing drag but also changes the lift characteristics of the body. Active aerodynamics are very important to reduce drag at varying speeds and environmental conditions and to offer the lightweight car superior stability. These systems have to be inexpensive, light, and no-fail systems. The pressure buildup at the leading edge of the car is reduced by injecting an air spike low at the bottom of the forward dam lips 102, 104 to create a high pressure area in front of the car to reduce lift and drag creates a "virtual air dam" that is controllable. This injector, comprised of two high pressure hoses (not shown) that run through the hollow center backbone from an engine driven air compressor, creates a high pressure area which can be automatically varied when the car passes over bridges or enters rain. This subsystem can use compressed air from an engine driven compressor. The same concept could be used in the rear as a "virtual aerodynamic rear wing" by injection high pressure air at varying angles up from the rear deck to lengthen flow and create downforce. This same effect can be used in the leading edge of the rear deck wing (not shown) and if used would automatically control the shape of the wing and therefore its downward pressure. This optional rear wing is attached directly to the suspension, and the wing's angle is controlled by the vehicle's computer which monitors the fly-by-wire brakes, front air dam sensors, and vehicle speed. This device may prove even more important for large trucks and high speed trains.

Coated Carbon Foams—Ultramet, Inc.

Figure 17A:
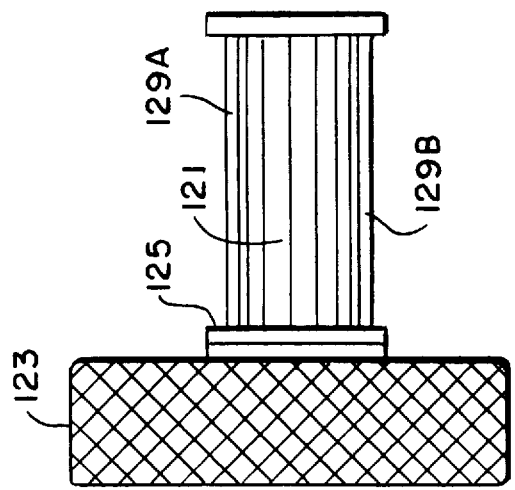
FIG. 17A is a view of a part of a strut and wheel assembly as viewed from the front or rear of the vehicle.
Figure 17B:
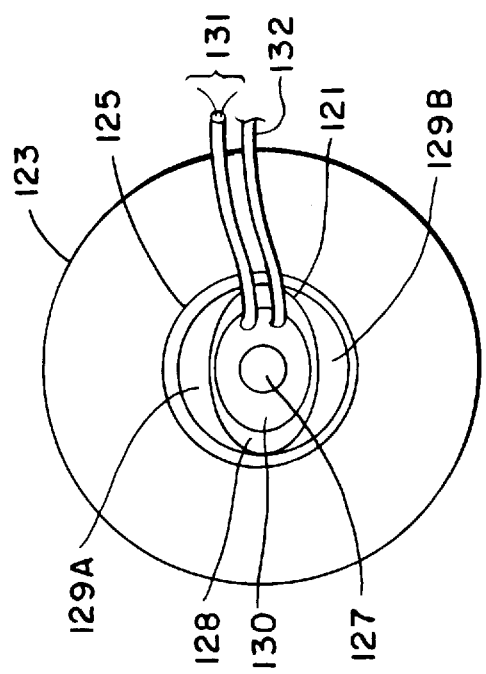
FIG. 17B is an end view of the arrangement shown in FIG. 17A as viewed from the right side of FIG. 17A.

New cellular structures, composed of ceramic, metal, and glass are used in the vehicle for structural, insulation purposes and to absorb kinetic energy. Benefits are: Low density, controlled thermal expansion, high chemical purity, high resistance to thermal induced stress and shock, high thermal stability (can withstand temperature 1000° F. greater than the temperatures at which NASA Space Shuttle tiles fail), and low cost. The Technology: Ultramet begins its process with skeleton material composed of carbon foam. The company than uses chemical vapor infiltration to deposit different materials, such as silicon carbide, rhenium, or tantalum on all surfaces of the carbon skeleton. The deposited material encapsulates or coats the skeleton to form a monolithic foam. This coating, rather than the carbon skeleton, establishes the mechanical, thermal, electrical, chemical, and physical properties of the foam while enhancing structural integrity. The Ultrametal process can produce foams of over 150 different materials and provide hybrid, layered, or graded foams. The controlled thermal expansion function has already been described in connection with the active suspension of FIGS. 17A and 17B and in connection with the air direction and flow control of the air dams depicted in FIG. 15.

Open-Cell Silicon Carbide Foam—Ultramet, Inc.

The vehicle may use open cell silicon carbide foam available in porosity (ppi) of 10 through 100. It has excellent thermal expansion, strength and modulus characteristics. (Cost: $0.40–$1.20 per cubic inch foams only; $3.00–$10.00 per cubic inch for electrically heated ceramic and metal substrates including the coated carbon foams).

Solid State Active Suspension

Suspensions for automobile have always suffered from parts failure, wear on bushings and joints, noise, corrosion, weight, and cost for configuring to the chassis. In accordance with the invention, a new technology is proposed (see FIGS. 17A and 17B) that reduces the suspension to one hollow strut 121 for each wheel 123. This composite strut 121 made of carbon fiber or other woven structural composite material has an oval cross section with the thick sides 128 fore and aft. This precisely locates the strut fore and aft but allows the strut to flex up and down. The drive shaft 127, hydraulic line(s) 132, and electrics 131 can be run down the interior of the hollow composite strut 121 to be completely protected. A layer of EP (expandable polymer) 129A, and optionally 129B, is attached with adhesives along the top surface, and optionally along the bottom surface, and connected with electrical wires 131 to a computer (not shown) which senses weight transfer, braking, and data from road surface monitors. The EP is a polymer that expands rapidly and strongly when electrical current is applied. Thus, under loads which tend to bend the strut 121 upwardly, when the upper layer 129A of EP that is bonded to the suspension strut 121 is expanded, the strut is forced downward creating a cost-effective, solid state form of active suspension. By applying current to both upper and lower EP layers 129A and 129B, the overall stiffness of the strut 121 is increased, effectively creating a laminated strut structure having bending stiffness increased in the manner of plywood construction. Such increased stiffness would be beneficial for off road vehicles.

Engine Compartment Crumple Zone

The engine area is one of the weakest structural areas in a car in terms of crashworthiness. It is also a dangerous area if the engine can be struck with enough force to break the engine free and into the cockpit rendering much damage to the driver and passenger.

The invention uses state-of-the-art materials and structures to create hollow honeycomb sections composed of high temperature thermoplastic, Zytol (Dupont) or high temperature polymides coated 1/16" thinwall hollow aluminum honeycomb, which is cut in "egg crate type sections" that fit in and fill the empty areas around the engine and fit together (interlocked) and easily attached. This honeycomb structure acts as a heat sink for the engine, directs cooling air more effectively, and in event of a crash creates an efficient crumple zone around the engine. It also baffles and absorbs engine and transmission noise significantly and can be easily removed for service. It also supports all accessories and wires, etc. It directs cooling air through the engine compartment and isolates heat and moisture from battery and other vulnerable systems.

Collision Resistant Doors (FIGS. 11–14)

The vehicle's doors 91, due to the special attributes of the aluminum/polymer composite, offer superior strength. They are designed as one piece extruded aluminum panels with internal aluminum matrices 78 and formed with hinge points 93 extending through the composite on the leading edge 94 to create a mounting location for special levered hinges 96. The back edge 98 and the leading edge 94 of each door 91 has notches 92 molded into them. When the door is closed, these notches receive compatible tabs 92A molded into the main chassis body on parts 45E and 77 thereby in effect making the door 91 a structural part of the chassis 3 in event of a crash. A hinge pin 76, preferably of aluminum, passes through aligned holes in the leading edge 94 of door 91 and through the tabs 92A received in spaced notches 93. This also eliminates vibrations and noises caused by a standard door which is basically a freestanding unit supported by the front hinges. The window mechanism is a separate unit (not shown) fitted and glued to the inside of the solid door unit. A drain slot is molded in below.

Vehicle Interior

The interior is designed to maximize safety, design adaptability, and minimize cost, weight and flammability. The design concepts revolve around redundancy, strength, and weight. It includes easily changeable padding panels all throughout the interior including dash, doors, and sun visors. The interior is designed to eliminate projectiles inside and outside the car during an accident and it is designed to reduce shock to the body during driving and accident situations.

The hard thermoplastic interior has snap or pop-in reversible thick shock absorbing panels. As an option, key areas such as the door and roof area can also have air bag type sections behind the interior panels for added safety. They all can be removed to easily and completely clean the car. A shock absorbing steering column in the car interior compresses during a crash. A shock absorber liner is beneath rugs to reduce foot and ankle injuries in case of an accident.

Affordable Mass Transit System

The inventor has developed a cost-effective light rail system. The system eliminates heavy, complex, costly service intensive rolling stock. This allows the completion of lightweight rail cars at a much lower cost due to lower tooling and labor costs. It also allows a complete recycling of the vehicles at the end of their service life. Alternatively, the composite body can be attached with adhesives to a standard format chassis composed of aluminum structural chassis members. This technology could prove very useful to future high speed rail development. It is strong, lightweight, and absorbs noise and vibration. It integrates well with aluminum, and it can be molded in large sections which can be fitted and glued together forming the long fuselages of the train. It also insulates, is highly crashworthy, and can be made flame resistant.

Environmental Composites could be used to replace certain application presently using fiberglass technology. Applications where the thicker section required by EC technology would not affect the product, such as small to medium sized boats where there is enough volume to offset the costs of the molds and aluminum stamping tooling. Advantages would be clean manufacturing with less labor component, built-in flotation, better crush characteristics, molded in colors which could eliminate the use of polluting bottom paint, superior flammability resistance, and far better ability to take and spread point loads. Also, fuel and water tanks would be molded into the hull as insulated structural members improving strength and eliminating condensation buildup and creating a flat interior floor section.

Other proposed uses for environmental composites
Airport ground support vehicle
Washing machine cabinets
Motorcycles
Farm implements
Airplane parts
Aerospace fuselage
Marine deck equipment
Paint ladder
Non-conductive composite ground support vehicles
Low cost stealth drones
Stealth general purpose vehicles
Stealth cruise missiles
Large marine hulls
Solar collector structure/skin
Ocean oil derrick equipment
Mass transit system
Rapid response composite armored vehicles
Snowmobiles and waterjet boats
Recreational vehicles
Cost-competitive hybrid trucks
Military "flying body" ground support airplanes and helicopters Inexpensive snow skis
Recyclable surfboards It is claimed:

1. A method of manufacturing a recyclable automobile chassis highly resistant to high-load impacts, comprising:

fabricating a plurality of generally planar bulkheads from a metal alloy;

disposing the bulkheads in a generally and mutually parallel orientation, each bulkhead perpendicular to and aligned generally transversely and symmetrically relative to a common central horizontal longitudinal axis;

fabricating a plurality of chassis segments from a metal alloy, each segment comprising a multiplicity of spaced hollow cells, the hollow cells being fixed at one end in a common surface;

interposing and rigidly attaching at least one of said pluralities of chassis segments between respective bulkheads to form a plurality of chassis sections, a section defined as the portion of the fabricated chassis between two adjacent bulkheads; and permeating the plurality of chassis sections with liquefied polymer between and around said hollow cells.

2. The method of claim 1, wherein the metal alloy is an aluminum alloy.

3. The method of claim 1, wherein said hollow cells are hexagonal in cross section and contiguously connected to form a gene ally planar honeycomb-cell structure.

4. The method of claim 1, wherein the polymer is selected from the group consisting of a polycarbonate, a polycarbonate/ABS blend, a polyimide, a reinforced liquid crystal polymer, poly-X, and combinations thereof.

5. The method of claim 1, wherein said liquefied polymer is prepared to contain microspheres to reduce weight of the permeated chassis sections.

6. The method of claim 1, comprising, before said step of permeating the plurality of chassis sections with liquefied polymer, heating the plurality of chassis sections to a common predetermined temperature sufficient to liquefy a polymer of a single preselected type.

7. The method of claim 1, wherein said permeating step employs a foam of said liquefied polymer.

8. The method of claim 1, wherein said step of fabricating a plurality of chassis segments comprises forming a central backbone portion in selected chassis segments, the central backbone portions being aligned along said longitudinal axis.

9. The method of claim 1 wherein the polymer is selected from the group consisting of reinforced liquid crystal polymer, poly-x and combinations thereof.

10. A method of manufacturing a recyclable automobile chassis, comprising the steps of:

fabricating a plurality of generally planar bulkheads from a metal alloy;

disposing the bulkheads in a generally and mutually parallel orientation, each bulkhead being situated generally perpendicularly to and aligned generally transversely and symmetrically relative to a common central horizontal longitudinal axis;

fabricating a plurality of chassis segments, each segment formed by providing a sheet of metal alloy comprising a multiplicity of spaced hollow cells fixed at one end in a common surface, the sheet being formed with protrusions by forcing portions of said sheet out of the surface of said sheet to project as closed thinwall projections defining said spaced hollow cells;

interposing and rigidly attaching at least one of said pluralities of chassis segments between respective bulkheads to form a plurality of self-aligning chassis sections, a section defined as the portion of the fabricated chassis between two adjacent bulkheads; and permeating the plurality of chassis sections with liquefied polymer between and around the hollow cells.

11. The method of claim 10, wherein said forming step is selected from the group consisting of stamping, superforming, and hydroforming.

12. An automobile chassis comprising:

a plurality of generally planar bulkheads;

a plurality of chassis segments, each segment having formed therein a multiplicity of spaced, outwardly projecting hollow cells, the hollow cells being fixed at one end to form a common surface, and each segment being interposed and rigidly attached between respective bulkheads to form a plurality of self-aligning chassis sections, a section defined as the portion of the fabricated chassis between two adjacent bulkheads; and a liquefied polymer permeating the plurality of chassis sections between and around said hollow cells.

13. The apparatus of claim 12, wherein the bulkheads are fabricated from a metal alloy.

14. The apparatus of claim 13, wherein the metal alloy is an aluminum alloy.

15. The apparatus of claim 12, wherein said hollow cells are hexagonal in cross section and contiguously connected to form a generally planar honeycomb-cell structure.

16. The apparatus of claim 12, wherein the polymer is selected from the group consisting of a polycarbonate, a polycarbonate/ABS blend, a polyamide, a reinforced liquid crystal polymer, poly-X, and combinations thereof.

17. The apparatus of claim 12, wherein said liquefied polymer is prepared to contain microspheres to reduce the weight of the permeated chassis sections.

18. A method of manufacturing a recyclable automobile chassis, comprising the steps of:

fabricating a plurality of generally planar bulkheads from a metal alloy;

disposing the bulkheads in a generally and mutually parallel orientation, each bulkhead being situated generally perpendicularly to and aligned generally transversely and symmetrically relative to a common central horizontal longitudinal axis;

fabricating a plurality of chassis segments from a metal alloy, each segment comprising a multiplicity of spaced hollow cells fixed at one end in a common surface; and interposing and rigidly attaching at least one of said pluralities of chassis segments between respective bulkheads to form a plurality of self-aligning chassis sections, a section defined as the portion of the fabricated chassis between two adjacent bulkheads.

19. The method of claim 18 further comprising the step of permeating the plurality of chassis sections with liquefied polymer between and around the hollow cells.

* * * * *